(12) United States Patent
Muirhead

(10) Patent No.: US 8,077,040 B2
(45) Date of Patent: Dec. 13, 2011

(54) RF-ENABLED PALLET

(75) Inventor: Scott A. W. Muirhead, Surrey (CA)

(73) Assignee: Nextreme, LLC, Lemont Furnace, PA (US)

( * ) Notice: Subject to any disclaimer, the term of this patent is extended or adjusted under 35 U.S.C. 154(b) by 982 days.

(21) Appl. No.: 11/981,091

(22) Filed: Oct. 31, 2007

(65) Prior Publication Data
US 2008/0122610 A1    May 29, 2008

Related U.S. Application Data

(63) Continuation of application No. 11/152,628, filed on Jun. 14, 2005, now Pat. No. 7,342,496, which is a continuation-in-part of application No. 09/770,097, filed on Jan. 24, 2001, now Pat. No. 6,943,678, application No. 11/981,091, which is a continuation-in-part of application No. 10/134,049, filed on Apr. 26, 2002, now Pat. No. 6,661,339, application No. 11/981,091, which is a continuation-in-part of application No. 10/798,932, filed on Mar. 11, 2004, now Pat. No. 7,735,430, which is a continuation of application No. 09/803,681, filed on Mar. 12, 2001, now Pat. No. 6,718,888.

(60) Provisional application No. 60/177,382, filed on Jan. 24, 2000, provisional application No. 60/286,450, filed on Apr. 27, 2001, provisional application No. 60/196,127, filed on Apr. 11, 2000.

(51) Int. Cl.
*G08B 13/14* (2006.01)

(52) U.S. Cl. ............ 340/572.1; 340/572.8; 340/539.13; 340/568.5

(58) Field of Classification Search ............... 340/572.1, 340/572.8, 539.13, 539.22, 57, 568.5, 825.36, 340/825.49
See application file for complete search history.

(56) References Cited

U.S. PATENT DOCUMENTS

| | | | |
|---|---|---|---|
| 3,398,434 A | 8/1968 | Alesi, Jr. et al. | 425/504 |
| 3,583,036 A | 6/1971 | Brown | 425/185 |
| 3,597,799 A | 8/1971 | Earle | 425/174 |
| 3,695,188 A | 10/1972 | Granatstein | 108/58 |
| 3,702,100 A | 11/1972 | Wharton | 108/53.3 |
| 3,719,157 A | 3/1973 | Arcocha et al. | 108/51 |

(Continued)

FOREIGN PATENT DOCUMENTS

DE    4313049 A1    4/1993

(Continued)

OTHER PUBLICATIONS

English language version of the abstract for German Patent Document No. DE19526131 downloaded from www.espacenet.com on Jun. 27, 2006.

(Continued)

*Primary Examiner* — Daryl Pope
(74) *Attorney, Agent, or Firm* — Price & Adams

(57) ABSTRACT

The inventions involve material handling apparatus developed to operate in radio frequency rich environments. Articles are provided having at least one large compartment capable of enclosing at least one electronic device or a package populated with a plurality of devices. RFID tags are also provided having three antenna arrays situated on three planes to improve electromagnetic and electrostatic coupling with an external distributed network of devices. Pallets are provided with cellular communications devices to provide track and trace functionality. Sensors and actuators are used in connection with the material handling apparatus.

20 Claims, 10 Drawing Sheets

U.S. PATENT DOCUMENTS

| | | | |
|---|---|---|---|
| 3,757,704 A | 9/1973 | Allgeyer et al. | 108/51 |
| 3,779,687 A | 12/1973 | Alesi | 425/383 |
| 3,783,078 A | 1/1974 | Brodhead | 156/499 |
| 3,787,158 A | 1/1974 | Brown et al. | 425/156 |
| 3,810,862 A | 5/1974 | Mathis et al. | 260/42.45 |
| 3,867,088 A | 2/1975 | Brown et al. | 425/504 |
| 3,868,209 A | 2/1975 | Howell | 425/504 |
| 3,919,382 A | 11/1975 | Smarook | 264/164 |
| 3,919,445 A | 11/1975 | Smarook | 428/116 |
| 3,919,446 A | 11/1975 | Smarook | 428/116 |
| 3,925,140 A | 12/1975 | Brown | 156/382 |
| 3,964,400 A | 6/1976 | Brand | 108/57.25 |
| 4,013,021 A | 3/1977 | Steinlein et al. | 108/57.25 |
| 4,070,839 A | 1/1978 | Clem | 52/448 |
| 4,079,232 A | 3/1978 | Brokoff et al. | 219/154 |
| 4,101,252 A | 7/1978 | Brown | 425/394 |
| 4,113,909 A | 9/1978 | Beasley | 428/116 |
| 4,133,270 A | 1/1979 | Ravera | 108/57.25 |
| 4,158,539 A | 6/1979 | Arends et al. | 425/451.4 |
| 4,164,387 A | 8/1979 | Schermutzki et al. | 425/371 |
| 4,164,389 A | 8/1979 | Beasley | 425/406 |
| 4,194,663 A | 3/1980 | West et al. | 226/139 |
| 4,220,100 A | 9/1980 | Palomo et al. | 108/51.1 |
| 4,244,915 A | 1/1981 | Boardman | 264/551 |
| 4,255,382 A | 3/1981 | Arends et al. | 264/544 |
| 4,287,836 A | 9/1981 | Aoki | 108/57.25 |
| 4,348,442 A | 9/1982 | Figge | 428/72 |
| 4,377,377 A | 3/1983 | Arends et al. | 425/155 |
| 4,428,306 A | 1/1984 | Dresen et al. | 108/53.3 |
| 4,464,329 A | 8/1984 | Whiteside et al. | 264/544 |
| 4,488,496 A | 12/1984 | Polacco | 108/51.3 |
| 4,500,213 A | 2/1985 | Grimm | 368/208 |
| 4,507,348 A | 3/1985 | Nagata et al. | 428/172 |
| 4,509,432 A | 4/1985 | Win | 108/57.25 |
| 4,509,909 A | 4/1985 | Arends | 425/388 |
| 4,513,048 A | 4/1985 | Kaube et al. | 428/188 |
| 4,531,901 A | 7/1985 | Andersen | 425/150 |
| 4,555,381 A | 11/1985 | Chazal et al. | 264/516 |
| 4,600,376 A | 7/1986 | Gillman et al. | 425/346 |
| 4,606,278 A | 8/1986 | Shuert | 108/57.25 |
| 4,608,009 A | 8/1986 | Whiteside et al. | 425/590 |
| 4,636,348 A | 1/1987 | Whiteside | 264/544 |
| 4,649,007 A | 3/1987 | Bonis et al. | 264/148 |
| 4,666,544 A | 5/1987 | Whiteside et al. | 156/212 |
| 4,727,102 A | 2/1988 | Scarso | 524/100 |
| 4,742,781 A | 5/1988 | Shuert | 108/53.3 |
| 4,801,347 A | 1/1989 | Garwood | 156/245 |
| 4,846,077 A | 7/1989 | Win | 108/57.25 |
| 4,879,956 A | 11/1989 | Shuert | 108/53.3 |
| 4,907,515 A | 3/1990 | Win | 108/57.25 |
| 4,969,812 A | 11/1990 | Brown | 425/398 |
| 5,007,225 A | 4/1991 | Teasdale | 52/783.17 |
| 5,030,501 A | 7/1991 | Colvin et al. | 428/178 |
| 5,042,396 A | 8/1991 | Shuert | 108/57.25 |
| 5,046,434 A | 9/1991 | Breezer et al. | 108/57.25 |
| 5,071,603 A | 12/1991 | Kurumaji et al. | 264/40.5 |
| 5,088,418 A | 2/1992 | Reckermann et al. | 108/57.25 |
| 5,108,529 A | 4/1992 | Shuert | 156/214 |
| 5,117,762 A | 6/1992 | Shuert | 108/51.1 |
| 5,123,359 A | 6/1992 | DelBalso | 108/57.27 |
| 5,123,541 A | 6/1992 | Giannini et al. | 206/600 |
| 5,143,778 A | 9/1992 | Shuert | 428/213 |
| 5,156,782 A | 10/1992 | Ballantyne | 264/40.5 |
| 5,164,211 A | 11/1992 | Comer | 426/129 |
| 5,167,969 A | 12/1992 | DeMaio, Jr. et al. | 425/388 |
| 5,168,817 A | 12/1992 | Nulle et al. | 108/57.29 |
| 5,197,395 A | 3/1993 | Pigott et al. | 108/56.1 |
| 5,197,396 A | 3/1993 | Breezer et al. | 108/56.3 |
| 5,205,221 A | 4/1993 | Melin et al. | 108/51.3 |
| 5,225,213 A | 7/1993 | Brown et al. | 425/292 |
| 5,226,373 A | 7/1993 | Esch | 108/57.19 |
| 5,229,648 A | 7/1993 | Sues et al. | 307/10.2 |
| 5,252,024 A | 10/1993 | Breda et al. | 414/806 |
| 5,255,613 A | 10/1993 | Shuert | 108/52.1 |
| 5,283,028 A | 2/1994 | Breezer et al. | 264/511 |
| 5,283,029 A | 2/1994 | Ellemor | 264/544 |
| 5,329,861 A | 7/1994 | McCarthy | 108/51.3 |
| 5,329,862 A | 7/1994 | Breezer et al. | 108/55.5 |
| 5,337,681 A | 8/1994 | Schrage | 108/56.1 |
| 5,351,627 A | 10/1994 | Junaedi | 108/56.1 |
| 5,351,628 A | 10/1994 | Breezer et al. | 108/56.1 |
| 5,351,629 A | 10/1994 | Breezer et al. | 108/56.3 |
| 5,356,983 A | 10/1994 | Vijayendran et al. | 524/416 |
| 5,367,960 A | 11/1994 | Schleicher | 108/57.32 |
| 5,367,961 A | 11/1994 | Arai et al. | 108/56.3 |
| 5,390,467 A | 2/1995 | Shuert | 52/783.14 |
| 5,391,251 A | 2/1995 | Shuert | 152/292 |
| 5,401,347 A | 3/1995 | Shuert | 156/245 |
| 5,402,735 A | 4/1995 | DeJean | 108/57.17 |
| 5,404,829 A | 4/1995 | Shuert | 108/57.26 |
| 5,407,632 A | 4/1995 | Constantino et al. | 264/565 |
| 5,408,937 A | 4/1995 | Knight, IV et al. | 108/55.5 |
| 5,413,052 A | 5/1995 | Breezer et al. | 108/56.1 |
| 5,427,732 A | 6/1995 | Shuert | 264/545 |
| 5,448,110 A | 9/1995 | Tuttle et al. | 257/723 |
| 5,470,641 A | 11/1995 | Shuert | 428/178 |
| 5,479,416 A | 12/1995 | Snodgrass et al. | 714/785 |
| 5,486,405 A | 1/1996 | Laves | 347/251 |
| 5,492,069 A | 2/1996 | Alexander et al. | 108/56.3 |
| 5,505,141 A | 4/1996 | Barber | 108/57.26 |
| 5,517,188 A | 5/1996 | Carroll et al. | 340/10.52 |
| 5,527,585 A | 6/1996 | Needham et al. | 428/156 |
| 5,531,585 A | 7/1996 | Lupke | 425/233 |
| 5,535,668 A | 7/1996 | Besaw et al. | 108/51.3 |
| 5,539,775 A | 7/1996 | Tuttle et al. | 375/145 |
| 5,555,820 A | 9/1996 | Shuert | 108/57.25 |
| 5,565,846 A | 10/1996 | Geiszler et al. | 340/572.2 |
| 5,565,858 A | 10/1996 | Guthrie | 340/10.33 |
| 5,566,624 A | 10/1996 | Brown et al. | 108/51.1 |
| 5,583,819 A | 12/1996 | Roesner et al. | 340/10.51 |
| 5,596,933 A | 1/1997 | Knight et al. | 108/57.27 |
| 5,606,921 A | 3/1997 | Elder et al. | 108/53.3 |
| 5,620,715 A | 4/1997 | Hart et al. | 425/143 |
| 5,624,622 A | 4/1997 | Boyce et al. | 264/258 |
| 5,624,630 A | 4/1997 | Breezer et al. | 264/553 |
| 5,635,129 A | 6/1997 | Breezer et al. | 264/553 |
| 5,635,306 A | 6/1997 | Minamida et al. | 428/593 |
| 5,638,760 A | 6/1997 | Jordan et al. | 108/51.1 |
| 5,648,031 A | 7/1997 | Sturtevant et al. | 264/80 |
| 5,649,295 A | 7/1997 | Shober et al. | 340/10.1 |
| 5,657,007 A | 8/1997 | Anderson et al. | 340/904 |
| 5,658,523 A | 8/1997 | Shuert | 264/545 |
| 5,661,457 A | 8/1997 | Ghaffari et al. | 340/572.7 |
| 5,662,048 A | 9/1997 | Kralj et al. | 108/56.3 |
| 5,664,322 A | 9/1997 | Best | 29/784 |
| 5,676,064 A | 10/1997 | Shuert | 108/51.1 |
| 5,686,928 A | 11/1997 | Pritchett et al. | 343/711 |
| 5,687,532 A | 11/1997 | Torrey | 52/656.3 |
| 5,687,652 A | 11/1997 | Ruma | 108/57.25 |
| 5,708,423 A | 1/1998 | Ghaffari et al. | 340/5.8 |
| 5,716,581 A | 2/1998 | Tirrell et al. | 264/545 |
| 5,728,424 A | 3/1998 | Walling | 427/180 |
| 5,730,252 A | 3/1998 | Herbinet | 186/52 |
| 5,755,162 A | 5/1998 | Knight et al. | 108/53.1 |
| 5,758,855 A | 6/1998 | Jordan et al. | 248/346.01 |
| 5,769,003 A | 6/1998 | Rose et al. | 108/55.3 |
| 5,774,876 A | 6/1998 | Woolley et al. | 705/28 |
| 5,778,801 A | 7/1998 | Delacour | 108/57.25 |
| 5,782,129 A | 7/1998 | Vanderzee et al. | 72/405.1 |
| 5,791,262 A | 8/1998 | Knight et al. | 108/57.25 |
| 5,794,542 A | 8/1998 | Besaw | 108/51.3 |
| 5,794,544 A | 8/1998 | Shuert | 108/57.25 |
| 5,800,846 A | 9/1998 | Hart | 425/508 |
| 5,804,810 A | 9/1998 | Woolley et al. | 235/492 |
| 5,806,436 A | 9/1998 | Weichenrieder, Sr. et al. | 108/57.23 |
| 5,812,951 A | 9/1998 | Ganesan et al. | 455/445 |
| 5,813,355 A | 9/1998 | Brown et al. | 108/53.3 |
| 5,814,185 A | 9/1998 | Chun et al. | 156/580 |
| 5,818,348 A | 10/1998 | Walczak et al. | 340/10.3 |
| 5,822,683 A | 10/1998 | Paschen | 340/10.34 |
| 5,822,714 A | 10/1998 | Cato | 702/108 |
| 5,828,737 A | 10/1998 | Sawyer | 379/114.07 |
| 5,830,299 A | 11/1998 | Teixidor Casanovas et al. | 156/70 |
| 5,834,535 A | 11/1998 | Abu-Isa et al. | 523/179 |
| 5,836,255 A | 11/1998 | Uitz | 108/57.25 |

| Patent | Date | Inventor | Class |
|---|---|---|---|
| 5,839,056 A | 11/1998 | Hakkinen | 455/69 |
| 5,843,366 A | 12/1998 | Shuert | 264/545 |
| 5,845,588 A | 12/1998 | Gronnevik | 108/57.27 |
| 5,860,369 A | 1/1999 | John et al. | 108/57.26 |
| 5,862,760 A | 1/1999 | Kohlhaas | 108/56.3 |
| 5,864,318 A | 1/1999 | Cosenza et al. | 343/700 MS |
| 5,868,080 A | 2/1999 | Wyler et al. | 108/57.25 |
| 5,875,393 A | 2/1999 | Altschul et al. | 455/407 |
| 5,879,495 A | 3/1999 | Evans | 156/82 |
| 5,885,691 A | 3/1999 | Breezer et al. | 428/156 |
| 5,894,803 A | 4/1999 | Kuga | 108/51.11 |
| 5,900,203 A | 5/1999 | Needham et al. | 264/248 |
| 5,908,135 A | 6/1999 | Bradford et al. | 220/673 |
| 5,921,189 A | 7/1999 | Estepp | 108/57.16 |
| 5,924,589 A | 7/1999 | Gordon | 220/23.91 |
| 5,929,779 A | 7/1999 | MacLellan et al. | 340/10.2 |
| 5,933,354 A | 8/1999 | Shimada et al. | 700/228 |
| 5,936,527 A | 8/1999 | Isaacman et al. | 340/572.1 |
| 5,942,987 A | 8/1999 | Heinrich et al. | 340/10.42 |
| 5,943,014 A | 8/1999 | Gilhousen | 342/465 |
| 5,946,878 A | 9/1999 | Grund et al. | 52/630 |
| 5,950,545 A | 9/1999 | Shuert | 108/53.3 |
| 5,950,546 A | 9/1999 | Brown et al. | 108/56.1 |
| 5,955,950 A | 9/1999 | Gallagher, III et al. | 340/572.1 |
| 5,963,144 A | 10/1999 | Kruest | 340/10.1 |
| 5,965,848 A | 10/1999 | Altschul et al. | 174/254 |
| 5,967,057 A | 10/1999 | Nakayama et al. | 108/57.25 |
| 5,971,592 A | 10/1999 | Kralj et al. | 700/225 |
| 5,973,599 A | 10/1999 | Nicholson et al. | 340/572.8 |
| 5,975,879 A | 11/1999 | Dresen et al. | 425/504 |
| 5,980,231 A | 11/1999 | Arends et al. | 425/397 |
| 5,984,126 A | 11/1999 | Gordon | 220/62.22 |
| 5,986,569 A | 11/1999 | Mish et al. | 340/10.42 |
| 5,986,570 A | 11/1999 | Black et al. | 340/10.2 |
| 5,989,706 A | 11/1999 | McGinniss et al. | 428/341 |
| 5,993,724 A | 11/1999 | Shuert | 264/545 |
| 5,999,091 A | 12/1999 | Wortham | 340/431 |
| 6,006,677 A | 12/1999 | Apps et al. | 108/57.25 |
| 6,013,949 A | 1/2000 | Tuttle | 257/723 |
| 6,018,641 A | 1/2000 | Tsubouchi et al. | 340/10.3 |
| 6,018,927 A | 2/2000 | Major | 52/793.1 |
| 6,021,721 A | 2/2000 | Rushton | 108/56.3 |
| 6,025,780 A | 2/2000 | Bowers et al. | 340/572.3 |
| 6,026,304 A | 2/2000 | Hilsenrath et al. | 455/456.2 |
| 6,027,027 A | 2/2000 | Smithgall | 235/488 |
| 6,029,583 A | 2/2000 | LeTrudet | 108/57.25 |
| 6,034,639 A | 3/2000 | Rawlins et al. | 360/95 |
| 6,095,787 A | 8/2000 | Bills, Sr. | 425/215 |
| 6,107,698 A | 8/2000 | Ochiai et al. | 307/43 |
| 6,107,920 A | 8/2000 | Eberhardt et al. | 340/572.7 |
| 6,109,190 A | 8/2000 | Hale et al. | 108/57.25 |
| 6,110,559 A | 8/2000 | De Keyser | 428/68 |
| 6,138,582 A | 10/2000 | Fujii et al. | 108/57.25 |
| 6,138,859 A | 10/2000 | Aulph et al. | 220/563 |
| 6,172,608 B1 | 1/2001 | Cole | 340/572.1 |
| 6,176,260 B1 | 1/2001 | Hahner et al. | 137/590 |
| 6,179,145 B1 | 1/2001 | Roth | 220/4.14 |
| 6,184,269 B1 | 2/2001 | Abu-Isa et al. | 523/179 |
| 6,199,488 B1 | 3/2001 | Favaron et al. | 108/57.25 |
| 6,212,401 B1 | 4/2001 | Ackley | 455/556.1 |
| 6,223,526 B1 | 5/2001 | Wissler et al. | 60/286 |
| 6,228,914 B1 | 5/2001 | Ford et al. | 524/124 |
| 6,240,365 B1 | 5/2001 | Bunn | 701/213 |
| 6,246,882 B1 | 6/2001 | Lachance | 455/456.4 |
| 6,255,949 B1 | 7/2001 | Nicholson et al. | 340/572.8 |
| 6,268,037 B1 | 7/2001 | Butler et al. | 428/100 |
| 6,276,387 B1 | 8/2001 | Pachciarz et al. | 137/43 |
| 6,278,413 B1 | 8/2001 | Hugh et al. | 343/818 |
| 6,293,420 B1 | 9/2001 | Richter et al. | 220/563 |
| 6,294,127 B1 | 9/2001 | Huse | 264/516 |
| 6,302,461 B1 | 10/2001 | Debras et al. | 294/68.1 |
| 6,305,568 B1 | 10/2001 | Suzuki et al. | 220/562 |
| 6,328,842 B1 | 12/2001 | Coninck et al. | 156/304.2 |
| 6,332,098 B2 | 12/2001 | Ross et al. | 700/226 |
| 6,338,420 B1 | 1/2002 | Pachciarz et al. | 220/562 |
| 6,344,508 B1 | 2/2002 | Endo et al. | 524/313 |
| 6,357,366 B1 | 3/2002 | Frankenberg | 108/57.25 |
| 6,372,079 B1 | 4/2002 | Coninck et al. | 156/304.2 |
| 6,372,176 B1 | 4/2002 | Ekendahl et al. | 264/545 |
| 6,379,606 B1 | 4/2002 | Chun et al. | 264/545 |
| 6,389,989 B1 | 5/2002 | Hagerty | 108/57.25 |
| 6,389,990 B1 | 5/2002 | Apps | 108/57.25 |
| 6,424,300 B1 | 7/2002 | Sanford et al. | 343/702 |
| 6,441,740 B1 | 8/2002 | Brady et al. | 340/572.7 |
| 6,456,852 B2 | 9/2002 | Bar et al. | 455/456.1 |
| 6,458,232 B1 | 10/2002 | Valentinsson | 156/182 |
| 6,483,434 B1 | 11/2002 | UmiKer | 340/572.1 |
| 6,496,806 B1 | 12/2002 | Horwitz et al. | 705/28 |
| 6,542,114 B1 | 4/2003 | Eagleson et al. | 342/357.07 |
| 6,563,417 B1 | 5/2003 | Shaw | 250/338.5 |
| 6,614,349 B1 | 9/2003 | Proctor et al. | 340/572.1 |
| 6,667,092 B1 | 12/2003 | Brollier et al. | 428/182 |
| 6,669,089 B2 | 12/2003 | Cybulski et al. | 235/385 |
| 6,687,238 B1 | 2/2004 | Soong et al. | 370/335 |
| 6,702,968 B2 | 3/2004 | Stevenson et al. | 264/104 |
| 6,710,891 B1 | 3/2004 | Vraa et al. | 358/1.12 |
| 6,717,516 B2 | 4/2004 | Bridgelall | 340/572.1 |
| 6,718,888 B2 | 4/2004 | Muirhead | 108/57.25 |
| 6,720,865 B1 | 4/2004 | Forster et al. | 340/10.1 |
| 6,720,866 B1 | 4/2004 | Sorrells et al. | 340/10.4 |
| 6,720,888 B2 | 4/2004 | Eagleson et al. | 340/435 |
| 6,724,306 B1 | 4/2004 | Parsley, Jr. et al. | 340/572.1 |
| 6,726,099 B2 | 4/2004 | Becker et al. | 235/380 |
| 6,735,630 B1 | 5/2004 | Gelvin et al. | 709/224 |
| 6,738,628 B1 | 5/2004 | McCall et al. | 455/456.1 |
| 6,743,319 B2 | 6/2004 | Kydd | 156/230 |
| 6,745,703 B2 | 6/2004 | Torrey et al. | 108/51.11 |
| 6,750,771 B1 | 6/2004 | Brand | 340/572.7 |
| 6,758,148 B2 | 7/2004 | Torrey et al. | 108/51.11 |
| 6,778,086 B2 | 8/2004 | Morrone et al. | 340/572.8 |
| 6,779,088 B1 | 8/2004 | Benveniste et al. | 711/145 |
| 6,784,234 B2 | 8/2004 | Adedeji et al. | 524/140 |
| 6,799,099 B2 | 9/2004 | Zeitler et al. | 701/23 |
| 6,801,833 B2 | 10/2004 | Pintsov et al. | 700/223 |
| 6,806,808 B1 | 10/2004 | Watters et al. | 340/10.41 |
| 6,809,703 B2 | 10/2004 | Serra | 343/895 |
| 6,812,824 B1 | 11/2004 | Goldinger et al. | 340/10.1 |
| 6,814,284 B2 | 11/2004 | Ehlers et al. | 222/402 |
| 6,814,287 B1 | 11/2004 | Chang et al. | 235/451 |
| 6,816,076 B2 | 11/2004 | Pomes | 340/572.1 |
| 6,817,522 B2 | 11/2004 | Brignone et al. | 235/385 |
| 6,830,181 B1 | 12/2004 | Bennett | 235/440 |
| 6,832,251 B1 | 12/2004 | Gelvin et al. | 709/224 |
| 6,844,857 B2 | 1/2005 | Loftus et al. | 343/725 |
| 6,847,892 B2 | 1/2005 | Zhou et al. | 701/213 |
| 6,849,677 B2 | 2/2005 | Overholt | 524/412 |
| 6,856,291 B2 | 2/2005 | Mickle et al. | 343/701 |
| 6,861,993 B2 | 3/2005 | Waldner | 343/742 |
| 6,865,516 B1 | 3/2005 | Richardson | 702/188 |
| 6,869,019 B1 | 3/2005 | Nagi et al. | 235/492 |
| 6,879,809 B1 | 4/2005 | Vega et al. | 455/41.1 |
| 6,879,876 B2 | 4/2005 | O'Dougherty et al. | 700/231 |
| 6,889,165 B2 | 5/2005 | Lind et al. | 702/183 |
| 6,895,221 B2 | 5/2005 | Gunnarsson | 455/41.2 |
| 6,895,255 B1 | 5/2005 | Bridgelall | 455/552.1 |
| 6,895,655 B2 | 5/2005 | Forster et al. | 29/600 |
| 6,897,827 B2 | 5/2005 | Senba et al. | 343/873 |
| 6,900,536 B1 | 5/2005 | Derbenwick et al. | 257/724 |
| 6,900,731 B2 | 5/2005 | Kreiner et al. | 340/572.1 |
| 6,900,762 B2 | 5/2005 | Andrews et al. | 342/463 |
| 6,903,656 B1 | 6/2005 | Lee | 340/572.1 |
| 6,903,704 B2 | 6/2005 | Forster et al. | 343/806 |
| 6,909,366 B1 | 6/2005 | Marsh et al. | 340/505 |
| 6,914,562 B2 | 7/2005 | Forster | 343/700 MS |
| 6,917,291 B2 | 7/2005 | Allen | 340/572.1 |
| 6,917,808 B1 | 7/2005 | Nelson | 455/436 |
| 6,922,059 B2 | 7/2005 | Zank et al. | 324/457 |
| 6,924,773 B1 | 8/2005 | Paratte | 343/728 |
| 6,924,777 B2 | 8/2005 | Reasoner et al. | 343/866 |
| 6,929,412 B1 | 8/2005 | Barrus et al. | 400/76 |
| 6,933,849 B2 | 8/2005 | Sawyer | 340/572.4 |
| 6,934,532 B2 | 8/2005 | Coppinger et al. | 455/412.1 |
| 6,934,540 B2 | 8/2005 | Twitchell, Jr. | 455/422.1 |
| 6,938,558 B1 | 9/2005 | Peres | 108/56.3 |
| 6,938,559 B2 | 9/2005 | Wullenweber | 108/57.25 |
| 6,940,392 B2 | 9/2005 | Chan et al. | 340/10.4 |
| 6,940,408 B2 | 9/2005 | Ferguson et al. | 340/572.7 |
| 6,940,455 B2 | 9/2005 | Plettner | 343/700 MS |

| | | | | | | |
|---|---|---|---|---|---|---|
| 6,941,184 B2 | 9/2005 | Ebert .................................. 700/115 | 2005/0024200 A1 | 2/2005 | Lambright et al. ......... 340/539.1 |
| 6,947,513 B2 | 9/2005 | O'Toole et al. ................. 375/374 | 2005/0024269 A1 | 2/2005 | Kotzin et al. .................. 343/702 |
| 6,988,079 B1 | 1/2006 | Or-Bach et al. ................. 705/28 | 2005/0024286 A1 | 2/2005 | Fukuda ........................... 343/816 |
| 6,989,751 B2 | 1/2006 | Richards ...................... 340/572.4 | 2005/0030160 A1 | 2/2005 | Goren et al. ................... 340/10.5 |
| 7,492,252 B2 * | 2/2009 | Maruyama ............... 340/539.26 | 2005/0040934 A1 | 2/2005 | Shanton ........................ 340/5.92 |
| 2001/0013516 A1 | 8/2001 | Boecker ........................ 220/562 | 2005/0043850 A1 | 2/2005 | Stevens et al. ................. 700/213 |
| 2001/0020622 A1 | 9/2001 | Schmidt et al. ................ 220/562 | 2005/0052281 A1 | 3/2005 | Bann ........................... 340/539.13 |
| 2001/0045433 A1 | 11/2001 | Ellis ............................... 220/562 | 2005/0052283 A1 | 3/2005 | Collins et al. ................ 340/572.7 |
| 2002/0017745 A1 | 2/2002 | Vorenkamp et al. ........... 264/492 | 2005/0054290 A1 | 3/2005 | Logan et al. ................... 455/41.2 |
| 2002/0020487 A1 | 2/2002 | Vorenkamp et al. ...... 156/244.19 | 2005/0060246 A1 | 3/2005 | Lastinger et al. ................ 705/28 |
| 2002/0020705 A1 | 2/2002 | Vorenkamp et al. .......... 220/4.14 | 2005/0065861 A1 | 3/2005 | Bann .................................. 705/28 |
| 2002/0021208 A1 | 2/2002 | Nicholson et al. ......... 340/10.34 | 2005/0068182 A1 | 3/2005 | Dunlap et al. ................ 340/572.8 |
| 2002/0063129 A1 | 5/2002 | Potter et al. ................... 220/4.13 | 2005/0071234 A1 | 3/2005 | Schon ............................... 705/22 |
| 2002/0066737 A1 | 6/2002 | Stack et al. ................... 220/564 | 2005/0076816 A1 | 4/2005 | Nakano ........................ 108/51.11 |
| 2002/0067267 A1 | 6/2002 | Kirkham ...................... 340/572.7 | 2005/0083177 A1 | 4/2005 | Willgert ........................ 340/10.1 |
| 2002/0081346 A1 | 6/2002 | Ekendahl et al. .............. 425/383 | 2005/0083180 A1 | 4/2005 | Horwitz et al. ................ 340/10.4 |
| 2002/0111819 A1 | 8/2002 | Li et al. ............................. 705/1 | 2005/0093701 A1 | 5/2005 | Hollon .......................... 340/572.8 |
| 2002/0115436 A1 | 8/2002 | Howell et al. ............... 455/426.1 | 2005/0097010 A1 | 5/2005 | Carrender ........................ 705/28 |
| 2002/0126013 A1 | 9/2002 | Bridgelall ................... 340/572.1 | 2005/0098620 A1 | 5/2005 | Dunlap, Jr. ..................... 235/375 |
| 2002/0130817 A1 | 9/2002 | Forster et al. ................. 343/770 | 2005/0099292 A1 | 5/2005 | Sajkowsky ............... 340/539.13 |
| 2002/0170961 A1 | 11/2002 | Dickson et al. ............... 235/383 | 2005/0103835 A1 | 5/2005 | Kunito et al. .................. 235/375 |
| 2002/0175872 A1 | 11/2002 | Apostolos ..................... 343/749 | 2005/0104747 A1 | 5/2005 | Silic et al. ....................... 340/944 |
| 2002/0190845 A1 | 12/2002 | Moore ......................... 340/10.3 | 2005/0104796 A1 | 5/2005 | Plettner et al. ................. 343/841 |
| 2002/0196771 A1 | 12/2002 | Vij et al. ........................ 370/349 | 2005/0107092 A1 | 5/2005 | Charych et al. ............. 455/456.1 |
| 2003/0005316 A1 | 1/2003 | Girard ............................ 713/193 | 2005/0110612 A1 | 5/2005 | Carrender ..................... 340/10.1 |
| 2003/0017845 A1 | 1/2003 | Doviak et al. ............... 455/556.1 | 2005/0128086 A1 | 6/2005 | Brown et al. ................ 340/572.7 |
| 2003/0050032 A1 | 3/2003 | Masaki ......................... 455/272 | 2005/0134461 A1 | 6/2005 | Gelbman et al. ............ 340/572.8 |
| 2003/0061113 A1 | 3/2003 | Petrovich et al. ............... 705/26 | 2005/0140511 A1 | 6/2005 | Bonnell et al. ............. 340/572.8 |
| 2003/0083920 A1 | 5/2003 | Richards et al. ................. 705/8 | 2005/0143133 A1 | 6/2005 | Bridgelall ................... 455/562.1 |
| 2003/0189490 A1 | 10/2003 | Hogerton et al. ........... 340/572.8 | 2005/0156576 A1 | 7/2005 | Gilbert et al. ................ 340/10.1 |
| 2004/0027289 A1 | 2/2004 | Huang ................... 343/700 MS | 2005/0159187 A1 | 7/2005 | Mendolia et al. ........... 455/562.1 |
| 2004/0046643 A1 | 3/2004 | Becker et al. ............... 340/10.41 | 2005/0168325 A1 | 8/2005 | Lievre et al. .................. 340/10.6 |
| 2004/0049428 A1 | 3/2004 | Soehnlen et al. ............... 705/25 | 2005/0168385 A1 | 8/2005 | Baker .................. 343/700 MS |
| 2004/0061324 A1 | 4/2004 | Howard ........................... 283/69 | 2005/0169345 A1 | 8/2005 | Urbas et al. ................... 374/100 |
| 2004/0067734 A1 | 4/2004 | Gunnarsson ................ 455/41.2 | 2005/0179604 A1 | 8/2005 | Liu et al. ....................... 343/742 |
| 2004/0069851 A1 | 4/2004 | Grunes et al. ................ 235/435 | 2005/0181783 A1 | 8/2005 | Foosaner et al. ............ 455/424 |
| 2004/0069852 A1 | 4/2004 | Seppinen et al. ............. 235/451 | 2005/0186902 A1 | 8/2005 | Lieffort et al. ............... 455/41.1 |
| 2004/0070504 A1 | 4/2004 | Brollier et al. ............. 340/572.8 | 2005/0190098 A1 | 9/2005 | Bridgelall et al. ............. 342/118 |
| 2004/0074959 A1 | 4/2004 | Foth et al. ..................... 235/375 | 2005/0190111 A1 | 9/2005 | King et al. ..................... 343/767 |
| 2004/0078151 A1 | 4/2004 | Aljadeff et al. ................ 702/40 | 2005/0190707 A1 | 9/2005 | Nishizawa et al. ........... 370/286 |
| 2004/0080299 A1 | 4/2004 | Forster et al. ................. 320/114 | 2005/0192031 A1 | 9/2005 | Vare ............................ 455/456.6 |
| 2004/0082296 A1 | 4/2004 | Twitchell, Jr. ................. 455/41.2 | 2005/0192727 A1 | 9/2005 | Shostak et al. .................. 701/37 |
| 2004/0083025 A1 | 4/2004 | Yamanouchi et al. ........ 700/213 | 2005/0193222 A1 | 9/2005 | Greene ............................... 726/5 |
| 2004/0085191 A1 | 5/2004 | Horwitz et al. ............... 340/10.3 | 2005/0193549 A1 | 9/2005 | Forster et al. ..................... 29/600 |
| 2004/0089408 A1 | 5/2004 | Brod et al. ...................... 156/230 | 2005/0194446 A1 | 9/2005 | Wiklof et al. .............. 235/462.46 |
| 2004/0089707 A1 | 5/2004 | Cortina et al. ................. 235/375 | 2005/0194640 A1 | 9/2005 | Lazarev ........................ 257/347 |
| 2004/0093116 A1 | 5/2004 | Mountz ......................... 700/216 | 2005/0195768 A1 | 9/2005 | Petite et al. .................... 370/335 |
| 2004/0094949 A1 | 5/2004 | Savagian et al. ............... 283/81 | 2005/0195775 A1 | 9/2005 | Petite et al. .................... 370/338 |
| 2004/0102869 A1 | 5/2004 | Andersen et al. ............. 700/215 | 2005/0198208 A1 | 9/2005 | Nystrom ........................ 709/219 |
| 2004/0102870 A1 | 5/2004 | Andersen et al. ............. 700/215 | 2005/0198228 A1 | 9/2005 | Bajwa et al. ................... 709/220 |
| 2004/0105411 A1 | 6/2004 | Boatwright et al. .......... 370/338 | 2005/0198348 A1 | 9/2005 | Yeates et al. ................... 709/232 |
| 2004/0106376 A1 | 6/2004 | Forster .......................... 455/41.2 | 2005/0199716 A1 | 9/2005 | Shafer et al. ................... 235/441 |
| 2004/0111335 A1 | 6/2004 | Black et al. ...................... 705/28 | 2005/0200457 A1 | 9/2005 | Bridgelall et al. ............ 340/10.3 |
| 2004/0112967 A1 | 6/2004 | Krappe et al. ................. 235/492 | 2005/0205676 A1 | 9/2005 | Saito .............................. 235/439 |
| 2004/0164864 A1 | 8/2004 | Chung et al. ................ 340/572.7 | 2005/0206503 A1 | 9/2005 | Corrado et al. ............... 340/10.5 |
| 2004/0171373 A1 | 9/2004 | Suda et al. .................... 455/415 | 2005/0206520 A1 | 9/2005 | Decker et al. ............. 340/539.22 |
| 2004/0174260 A1 | 9/2004 | Wagner ...................... 340/568.1 | 2005/0206555 A1 | 9/2005 | Bridgelall et al. .............. 342/127 |
| 2004/0177012 A1 | 9/2004 | Flanagan ......................... 705/28 | 2005/0206562 A1 | 9/2005 | Wilson et al. ............... 342/357.07 |
| 2004/0177032 A1 | 9/2004 | Bradley et al. .................. 705/38 | 2005/0207381 A1 | 9/2005 | Aljadeff et al. ............... 370/338 |
| 2004/0185667 A1 | 9/2004 | Jenson ........................... 438/689 | 2005/0222701 A1 | 10/2005 | Ekberg ........................... 700/107 |
| 2004/0203352 A1 | 10/2004 | Hall et al. .................... 455/41.1 | 2005/0232747 A1 | 10/2005 | Brackmann et al. .......... 414/803 |
| 2004/0203355 A1 | 10/2004 | Light et al. .................... 455/41.1 | 2005/0237195 A1 | 10/2005 | Urban ........................ 340/572.1 |
| 2004/0203377 A1 | 10/2004 | Eaton et al. ................... 455/41.2 | 2006/0011108 A1 | 1/2006 | Abu-Isa et al. ............. 108/57.25 |
| 2004/0212479 A1 | 10/2004 | Gilbert et al. ............... 340/10.34 | 2006/0236903 A1 | 10/2006 | Moore ......................... 108/57.25 |
| 2004/0217865 A1 | 11/2004 | Turner ........................ 340/572.7 | | | |
| 2004/0217867 A1 | 11/2004 | Bridgelall et al. .......... 340/572.8 | FOREIGN PATENT DOCUMENTS | | |
| 2004/0219951 A1 | 11/2004 | Holder .......................... 455/566 | DE | 4334668 A1 | 4/1995 |
| 2004/0226392 A1 | 11/2004 | McNally ....................... 73/866.1 | DE | 19526131 | 1/1997 |
| 2004/0233789 A1 | 11/2004 | Oguchi et al. .................. 368/47 | DE | 10024421 | 11/2001 |
| 2004/0238623 A1 | 12/2004 | Asp ............................... 235/380 | EP | 0025510 | 3/1981 |
| 2004/0239498 A1 | 12/2004 | Miller ...................... 340/539.13 | EP | 0400640 | 5/1990 |
| 2004/0249538 A1 | 12/2004 | Osaki et al. ..................... 701/50 | EP | 0249203 | 9/1990 |
| 2004/0252025 A1 | 12/2004 | Silverbrook et al. ....... 340/568.5 | EP | 0412020 A1 | 6/1991 |
| 2004/0263319 A1 | 12/2004 | Huomo ......................... 340/10.2 | EP | 0458722 A1 | 11/1991 |
| 2004/0263329 A1 | 12/2004 | Cargonja et al. .......... 340/539.22 | EP | 0535919 A2 | 4/1993 |
| 2005/0004281 A1 | 1/2005 | Adedeji et al. ................. 524/115 | EP | 0905057 A1 | 3/1999 |
| 2005/0012613 A1 | 1/2005 | Eckstein et al. ........... 340/539.13 | EP | 1382533 A2 | 1/2004 |
| 2005/0012616 A1 | 1/2005 | Forster et al. ............... 340/572.7 | FR | 2697801 | 5/1994 |
| 2005/0017899 A1 | 1/2005 | Cervinka et al. ........... 342/357.7 | JP | 10-32851 | 9/1990 |

| | | |
|---|---|---|
| JP | 4173699 | 6/1992 |
| JP | 5085545 | 4/1993 |
| JP | 5155600 | 6/1993 |
| JP | 5262499 | 10/1993 |
| JP | 8011885 | 1/1996 |
| JP | 8244773 | 9/1996 |
| JP | 9-41756 | 2/1997 |
| JP | 9254983 | 9/1997 |
| JP | 10182096 | 9/1998 |
| JP | 10250735 | 11/1998 |
| JP | 10305997 | 1/1999 |
| JP | 11001230 | 1/1999 |
| JP | 2001026309 | 1/2001 |
| JP | 2001233337 | 8/2001 |
| JP | 2001278270 | 10/2001 |
| JP | 2002154618 | 5/2002 |
| JP | 2002265060 | 9/2002 |
| JP | 2003095270 | 4/2003 |
| JP | 2005104498 | 4/2005 |
| NL | 9401836 | 6/1996 |
| WO | WO 94/24010 | 10/1994 |
| WO | WO 98/21691 | 5/1998 |
| WO | WO 98/36929 | 8/1998 |
| WO | WO 99/14485 | 3/1999 |
| WO | WO 99/44851 | 9/1999 |
| WO | WO 99/56977 | 11/1999 |
| WO | WO 99/64221 | 12/1999 |
| WO | WO 00/43230 | 7/2000 |
| WO | WO 00/47437 | 8/2000 |
| WO | WO 00/48859 | 8/2000 |
| WO | WO 00/64694 | 11/2000 |
| WO | WO 00/74965 | 12/2000 |
| WO | WO 01/00433 | 1/2001 |
| WO | WO 02/36380 | 5/2002 |

OTHER PUBLICATIONS

English language version of the abstract for German Patent Document No. DE4334668 downloaded from www.espacenet.com on Jun. 27, 2006.
English language version of the abstract for European Patent Document No. EP0025510 downloaded from www.espacenet.com on Jun. 27, 2006.
English language version of the abstract for European Patent Document No. EP0412020 downloaded from www.espacenet.com on Jun. 27, 2006.
English language version of the abstract for French Patent Document No. FR2697801 downloaded from www.espacenet.com on Jun. 27, 2006.
English language version of the abstract for Japanese Patent Document No. JP10182096 downloaded from www.espacenet.com on Jun. 27, 2006.
English language version of the abstract for Japanese Patent Document No. JP10250735 downloaded from www.espacenet.com on Jun. 27, 2006.
English language version of the abstract for Japanese Patent Document No. JP10305997 downloaded from www.espacenet.com on Jun. 27, 2006.
English language version of the abstract for Japanese Patent Document No. JP11001230 downloaded from www.espacenet.com on Jun. 27, 2006.
English language version of the abstract for Japanese Patent Document No. JP2001026309 downloaded from www.espacenet.com on Jun. 27, 2006.
English language version of the abstract for Japanese Patent Document No. JP2001233337 downloaded from www.espacenet.com on Jun. 27, 2006.
English language version of the abstract for Japanese Patent Document No. JP2001278270 downloaded from www.espacenet.com on Jun. 27, 2006.
English language version of the abstract for Japanese Patent Document No. JP2002154618 downloaded from www.espacenet.com on Jun. 27, 2006.
English language version of the abstract for Japanese Patent Document No. JP2002265060 downloaded from www.espacenet.com on Jun. 27, 2006.
English language version of the abstract for Japanese Patent Document No. JP2003095270 downloaded from www.espacenet.com on Jun. 27, 2006.
English language version of the abstract for Japanese Patent Document No. JP2005104498 downloaded from www.espacenet.com on Jun. 27, 2006.
English language version of the abstract for Japanese Patent Document No. JP4173699 downloaded from www.espacenet.com on Jun. 27, 2006.
English language version of the abstract for Japanese Patent Document No. JP5085545 downloaded from www.espacenet.com on Jun. 27, 2006.
English language version of the abstract for Japanese Patent Document No. JP5155600 downloaded from www.espacenet.com on Jun. 27, 2006.
English language version of the abstract for Japanese Patent Document No. JP5262499 downloaded from www.espacenet.com on Jun. 27, 2006.
English language version of the abstract for Japanese Patent Document No. JP8011885 downloaded from www.espacenet.com on Jun. 27, 2006.
English language version of the abstract for Japanese Patent Document No. JP8244773 downloaded from www.espacenet.com on Jun. 27, 2006.
English language version of the abstract for Japanese Patent Document No. JP9254983 downloaded from www.espacenet.com on Jun. 27, 2006.
Plastics News article, Visteon Corp. to Thermoform Fuel Tanks, Crain Communications Inc., Oct. 16, 2000, 2 pages.
English Abstract of Japanese Patent Publication 10032851 (Feb. 16, 1998).
English Abstract of Japanese Patent Publication 090041756 (Sep. 11, 1998).
Kevin R. Sharp, http://www.idsystems.com/implementer/ articles/ deli0299.htm, A Delicate Balance: Multifrequency RF Management, 4 pages, Feb. 1999.
Kevin R. Sharp, http://www.idsystems.com/reader/1999_03/ phys0399.htm, Physical Reality, 4 pages, Mar. 1999.
Kevin R. Sharp, http://www.idsystems.com/reader/1999_09/ rfid0999.htm, RFID: What's it Worth to You?, 4 pages, Sep. 1999.
Kevin R. Sharp, http://www,idsystems.com/reader/1999_11/ good1199.htm, Good Design Makes RFID Work, 4 pages, Nov. 1999.
Kevin R. Sharp, http://www.idsystems.com/reader/1999_05/ join0599.htm, Joint Venture Produces New RFID Chips, 4 pages, May 1999.
Kevin R. Sharp, http://www.idsystems.com/reader/1999_05/ less0599.htm, Lessons from the Front, 5 pages, May 1999.
Paul Quinn, http://www.idsystems.com/reader/1999_05/ comm0599/comm09599.htm, Could this be the Start of Something Big!, 2 pages, May 1999.
Paul Quinn, http://www.idsystems.com/reader/2000_01/high0100/ high0100htm, A Highly Pallet-able Solution, 3 pages, Jan. 2000.
MicroID™ 125 kHz RFID System Design Guide, entire booklet, 1998 Microchip Technology Inc., Dec. 1998.
FastTrack™ Series RFID Tags, Escort Memory Systems, Inc. 1999, Publication No. 17-5128, 6 pages.
Jay Werb & Colin Larel, http://www.pinpointco.com/_private/ whitep Designing a Positioning System for Finding Things and People Indoors, 11 pages, 1988.
Tag-it™ Inlays Texas Instruments, 2 sheets, 1999.
Modern Plastics, www.modplas.com, News Briefs, Visteon Readies Thermoforming for Fuel Tanks, p. 14, Feb. 2001.
Jan H. Schut, http://www.plasticstechnology.com/Scripts/SP-MainPT...backslash.200012fal.htm, Move Over Blow Molding, 8 pages, Dec. 2000.
Cheryl German, http:www.kiefeltech.com/march_10_2000_2. htm, KTI Announces New Process for the Manufacture of Fuel Tanks Using Twin Sheet Forming, 2 pages, Mar. 10, 2000.
Rhoda Miel, http:www.plasticsnews.com/subscriber/headlines2. phtm, TI develops way to cap emissions, 2 pages, Dec. 1, 2000.
Eliminating Emissions, http:www.visteon.com/news/features/ 091300.html, 2 pages, Oct. 18, 2000.

Rhoda Miel, http:/www.plasticsnews.com/subscriber/ headlines2. phtm, Mannesmann eyes injection molded fuel tank, 2 pages, Mar. 9, 2001.

Brindley, Chaille, "Going Up in Smoke", Industrial Reporting, Inc., Oct. 1, 2001.

Electronics Industry Pallet Specification Draft Updated Sep. 6, 2001, p. 8.

English language version of the abstract for German Patent Document No. DE10024421 downloaded from www.espacenet.com on Feb. 2, 2007.

Witt, Clyde E., "Jumping Through Plastic Hoops of Fire", Material Handling Management, Oct. 2002.

"Fire and Polyvinyl Chloride", The Vinyl Institute, 1996, pp. 1-16.

\* cited by examiner

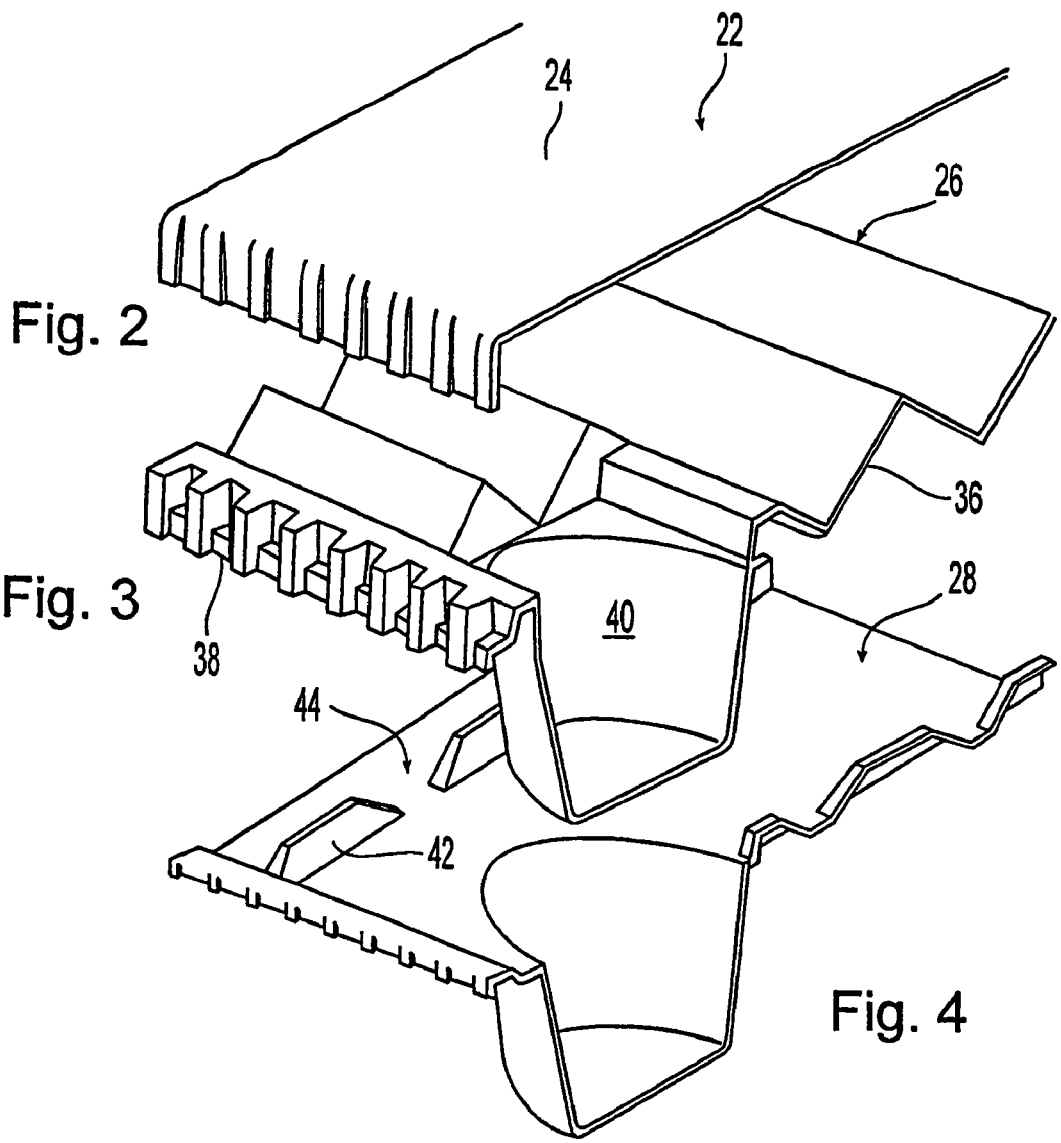
Fig. 2
Fig. 3
Fig. 4
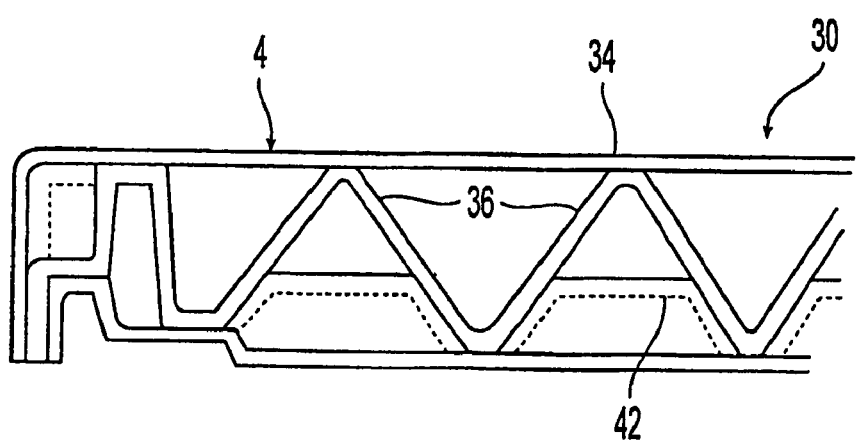
Fig. 5

RF-ENABLED PALLET

CROSS-REFERENCE TO RELATED APPLICATIONS

This application is a continuation of U.S. patent application Ser. No. 11/152,628 filed on Jun. 14, 2005, which claims the benefit of U.S. patent application Ser. No. 09/770,097 filed on Jan. 24, 2001, which claims the benefit of U.S. Provisional Application No. 60/177,382, filed Jan. 24, 2000. This application further claims the benefit of U.S. patent application Ser. No. 10/134,049 filed Apr. 26, 2002, which claims the benefit of U.S. Provisional Application No. 60/286,450 filed on Apr. 27, 2001, now U.S. Pat. No. 6,661,339, which issued Dec. 9, 2003. This application further claims the benefit of U.S. patent application Ser. No. 10/798,932 filed Mar. 11, 2004, which is a continuation of U.S. patent application Ser. No. 09/803,681 filed on Mar. 12, 2001, which claims the benefit of U.S. Provisional Application 60/196,127 filed on Apr. 11, 2000, now U.S. Pat. No. 6,718,888. The disclosures of the above applications are incorporated herein in their entirety by reference.

BACKGROUND OF THE INVENTION

1. Field of the Invention

This invention relates to plastic pallets and in particular to plastic pallets developed to operate within radio frequency rich environments.

2. Description of the Related Art

Pallets are used to move products through supply chains and to store products between movements. Wood has been the preferred material of pallet construction. A number of standard pallet sizes, such as the Grocery Manufacturers Association ("GMA") style 48×40 inch pallet, have been used to facilitate the wide spread use of wooden pallets across differing distribution networks with some success. Such pallets are utilized in great numbers in what is known in industry as "pallet exchange". It is estimated that there are 2.2 billion wood pallets in North America.

Wooden pallets have problems. In particular, wooden pallets deteriorate with use and cause problems that add user costs. Fortune 500 companies that utilize large numbers of wooden pallets seek to overcome problems associated with deteriorating pallets by hiring wooden pallets from pallet rental companies. Pallet rental companies maintain large pools of wooden pallets and repair damaged wooden pallets before they are re-used. Large users of wooden pallets have therefore been able to manage their costs by transferring the burdens associated with wooden pallet deterioration and pallet exchange to other supply chain service companies.

Although the business model used by pallet rental companies has enjoyed some success, there have been problems. For example, it is difficult to keep track of wooden pallets after they are let for hire. Chep International, the largest pallet pooling company, reportedly lost 14 million wooden pallets, and booked a $238 million adjustment in its financial reporting. These pallet tracking and other inherent wooden pallet problems have increased the need to modify business models relating to the use of pallets for rental purposes.

For example, there are several business conditions and economic factors combined with a convergence of technologies that have led to the creation of track and trace technologies exemplified by the term RFID (radio frequency identification) RFID holds the promise of providing real time supply chain visibility so that in the first instance pallet rental companies would be able to track their rental assets and in the second instance so that pallet users could trace their product through the supply chain.

Implementation of RFID, in one respect, involves the attachment of a tag, which contains a unique identification code, onto a pallet and a distributed network of tag readers. The tag readers associate a tag with a known location to determine the status or progress of the pallet within the supply chain. In this manner, the pallet can be tracked and traced with some accuracy, and the status of the pallet can be queried and displayed according to well understood principles by industry.

Implementation of any RFID system is problematic with regard to wooden pallets. For instance, in U.S. patent application Ser. No. 10/701,745, which is assigned to Chep International, it is suggested that a tag can be positioned exteriorly upon a nine block GMA style 48×40 inch wooden pallet. Thus, as each tag is read its location would be known. There are however several problems with such an arrangement. In the first instance, it is known that wood absorbs liquid and liquids interfere with radio frequency signals. Therefore, the reliability of communication between the reader and the tag could be compromised by the wooden materials utilized in the construction of the pallet. In a second instance, a tag that is exteriorly positioned upon a surface of a wooden pallet would be subject to a high level of the wear and tear. The impact of a fork tine against an exteriorly positioned tag could result in the destruction of the tag and the loss of the data stored in the memory of the tag. In the final analysis, wood is not a suitable material for constructing pallets that must work within radio frequency rich environments.

As a result of some of the aforementioned circumstances and problems industry has attempted to utilize plastic materials in the construction of pallets. The replacement of wood with plastic has had some success but there have been problems associated with the use of plastic pallets that are to be used in association with track and trace technologies including RFID.

An early example of a plastic pallet that employees a data collection device (i.e. a tag) to provide a track and trace capability is described in U.S. Pat. No. 5,971,592 to Kralj et al. In this cited reference the data collection devices are contained in cavities located on each side of the four corners of the pallet. The apparent need for a tag in each corner is due to, the short interrogation range of the readers of the day. In this arrangement a plurality of tags are required which would be more costly than an arrangement in which only one tag is required.

Similarly, in U.S. Pat. No. 6,199,488 to Favaron et al., a plastic pallet with two RFID cards (i.e. tags) is shown and described. The cards are positioned at angles and in the opposite corners so that at least one card is in communication range with a detector (i.e. a reader) from a side position (i.e. from a portal column or fork lift mounted reader). Although the Favaron et al. arrangement utilizes fewer tags than the Kralj et al. arrangement, Favaron et al. nevertheless utilizes more than one tag which is less economical than the use of one tag. A similar arrangement, requiring two or more tags, is disclosed in more thorough detail in U.S. Pat. No. 6,669,089, which was filed Nov. 12, 2001, and is assigned to 3M Innovative Properties Company.

Presumably, the arrangements suggested by Kralj et al. would be more reliable than the arrangement of application '745 because the devices of Kralj et al. are enclosed within the structures forming the pallet and therefore are less susceptible than exteriorly mounted tags to damage from fork impacts, wear and tear and the like. Furthermore, Kralj et al. would be more reliable than Favaron et al. because although Favaron et al. contemplates the containment of the tag within the body of the pallet, the Favaron et al. arrangement could allow liquids and other debris to penetrate into and accumulate within a socket wherein the tag of Favaron et al. is located. Liquids and debris within the socket could damage the tag or result in unreliable communication between the tag and the reader.

In U.S. Pat. No. 6,483,434, which is assigned to IFCO Systems, another pallet rental company, it is suggested that the delicate components of a transponder (i.e. a tag) can be protectively housed inside a plastic casing. The casing containing the delicate transponder could be subsequently positioned inside an injection mold and incorporated safely into an injection molded component forming part of a plastic pallet. This arrangement would protect the tags and overcome the problem associated with Favaron et al, wherein the tags are indirectly exposed to wear and tear.

Although the arrangements encasing the RFID tags within the plastic pallet embodiments cited above offer levels of protection superior to the method of application '745, such arrangements nevertheless have additional problems. In particular, in order to remove, replace or repair the tags of the prior art references, the plastic pallets themselves would have to be deconstructed or destroyed to provide access to the tags. Accordingly, the prior art does not contemplate an efficient means to either replace defective or damaged tags or to upgrade long lasting plastic pallets with new tags incorporating enhanced capabilities as these become available. It should be noted that a plastic pallet can have a life span of +/− ten years, which length of time may easily exceed the lifecycle of a deployed RFID technology.

In U.S. Pat. No. 6,814,287 to Chang et al. a pallet apparatus equipped with a radio frequency recognition module is described. In a first wooden pallet embodiment the module comprises a molded cup forming a compartment that receives a tag. The cup is covered by a cap to enclose the tag inside the compartment. The module is inserted into a cavity formed in a block or stringer of the wooden pallet. In a second plastic pallet embodiment, the module comprises a removable clip for holding a tag and the clip attaches to the exterior of the plastic pallet. Both embodiments provide an efficient means for accessing a tag without deconstructing or destroying the pallet itself. However, in both cases the module could become detached from the associated pallet resulting in the loss of data and possibly the pallet.

In the above cited references two or more tags are suggested so that information can be obtained from at least one tag. However, in order to write information into the two or more tags, the tags would have to be synchronized with one another. This adds complexity to the implementation of RFID methods and systems. When only a single tag is attached to one side of a pallet, the pallet itself could become an obstacle. In this case the pallet would need to be rotated so that the pallet side with the tag faces the reader. Rotating the pallet is time consuming.

Accordingly, it has been suggested that a tag can be positioned substantially in the center region of the pallet. For example, publication document Netherlands 9401836 proposes locating a tag in the center of a pallet and mounting readers on the tines of a fork lift to enable the reader to communicate with the tag. This arrangement is not amenable to reading the tag from the side through a portal mounted reader. For example, the metal tines could block signals intended for the tag. In U.S. patent application Ser. No. 10/962,574, a preferred embodiment involves forming a through hole penetrating from one to the other side of the pallet, and positioning a tag inside the through hole in the vicinity of the middle of the pallet. The through hole is characterized as a transmission pathway for radio frequencies traveling between the tag and the reader. One problem with U.S. patent application Ser. No. 10/962,574 is that the through hole could collect debris that could impair the operability of the tag.

As discussed above, the life cycle of a plastic pallet may exceed the useful life cycle of a tag technology. Therefore, it would be advantageous in the adaptation of the plastic pallet to anticipate replacement of earlier tags with technologically up-dated tags. In U.S. Pat. No. 6,844,857, assigned to Linpac Moulding, it has been suggested that a recess, provided with a cover, could be developed to enable the removal and exchange of a circuit (i.e. tag IC) to program the circuit with current data or to exchange the circuit in the case of damage or malfunction or to update tag technology. Although the arrangement does not contemplate the destruction of the plastic pallet to access the tag IC, the recess of U.S. Pat. No. 6,844,857 is not developed to accommodate more than one tag IC at a time. This is a problem because there is a need to provide pallets with a plurality of tags so that the pallet can function across non-interoperable RFID systems existing within the supply chain.

In U.S. Pat. No. 6,816,076, assigned to Allibert Equipment, the advantage of providing a plastic pallet with a tag holder (i.e. a recess) is offered. The tag holder is an open design and provides an easy way to change a tag. The carrier (i.e. pallet) disclosed in U.S. Pat. No. 6,816,076 also contemplates the use of first and second tags involving a relay relationship, in which the antenna of the second tag is operable to increase the read range of the first tag. Such an arrangement is impractical because the first tag incorporated into the plastic pallet that contains the unique pallet ID becomes redundant once the unique ID of the first tag is associated with the unique ID of the second tag.

What is needed is a plastic pallet that is adapted to operate in a radio frequency rich environment. In particular, the pallet must be able to protect RF devices from wear and tear. Where practical, only one tag indicative of a first characteristic should be required, not two tags as is known in the art. The pallet must also provide access to the devices for any number of purposes as would be anticipated in the art.

SUMMARY OF THE INVENTION

In accordance with the present invention a pallet is provided that is amenable to operating in an RF-rich environment. Towards this end the materials utilized to construct the pallet comprise materials that are substantially transparent to RF signals so that RF signals may pass through the materials utilized to construct the pallet.

It is another object to provide a pallet product with multiple unique identification codes so that a plurality of components each with individual IDs can be combined to form a single product having its own unique product ID. This aspect allows a variety of parties to enjoy multiple levels of product identification.

It is another object to provide the pallet with at least one compartment to accommodate identification devices therein. According to this aspect, in one embodiment, the compartment is created as part of the pallet structure and is located in a position that enables the compartment to occupy a large space to accommodate at least one large identification device.

It is another object to provide an identification device that takes advantage of the large size of the compartment of the pallet. Toward this end the identification device is formed to reside in three planes within the compartment to communicate with external RF apparatus positioned adjacent said pallet. In another aspect the multi-planar device is also multi-modal such that the device operates electromagnetically and electrostatically. In another aspect the multi-planar device is multi-band such that the device operates at different frequency bands used within the supply chain.

It is another object to provide a pallet that accommodates identification apparatus that omits a distributed network of reader devices to facilitate communication between a pallet ID device and a remote host. Toward this end a pallet includes an apparatus populated with at least one of a cellular communications module, a GPS communications module, a Bluetooth communications module, a LAN communications module, a PCS communications module, an interrogation module or any other wireless communications means module as may be anticipated looking forward into the future wherein apparatus is provided to enable close range (up to 10 yards), intermediate range (up to 300 yards) and long range (to several miles) air interface communications without relying upon cable or wire connections. In still further connection with aspect, a pallet is provided that couples said wireless communication devices, including RFID tags and the like, with sensors to monitor conditions indicative of at least one particular external environmental factor.

BRIEF DESCRIPTION OF THE DRAWINGS

The foregoing and other features and advantages of the present invention will be more readily appreciated as the same become better understood from the following detailed description when taken in conjunction with the accompanying drawings, wherein:

FIGS. 2-4 represent an exploded sectional view of deck structure of the pallet indicated at the position 20 of FIG. 1;

FIG. 5 is a side elevation view of the deck structure of the pallet showing the three sheets of a preferred embodiment;

DESCRIPTION OF THE PREFERRED EMBODIMENTS

Figure 1:
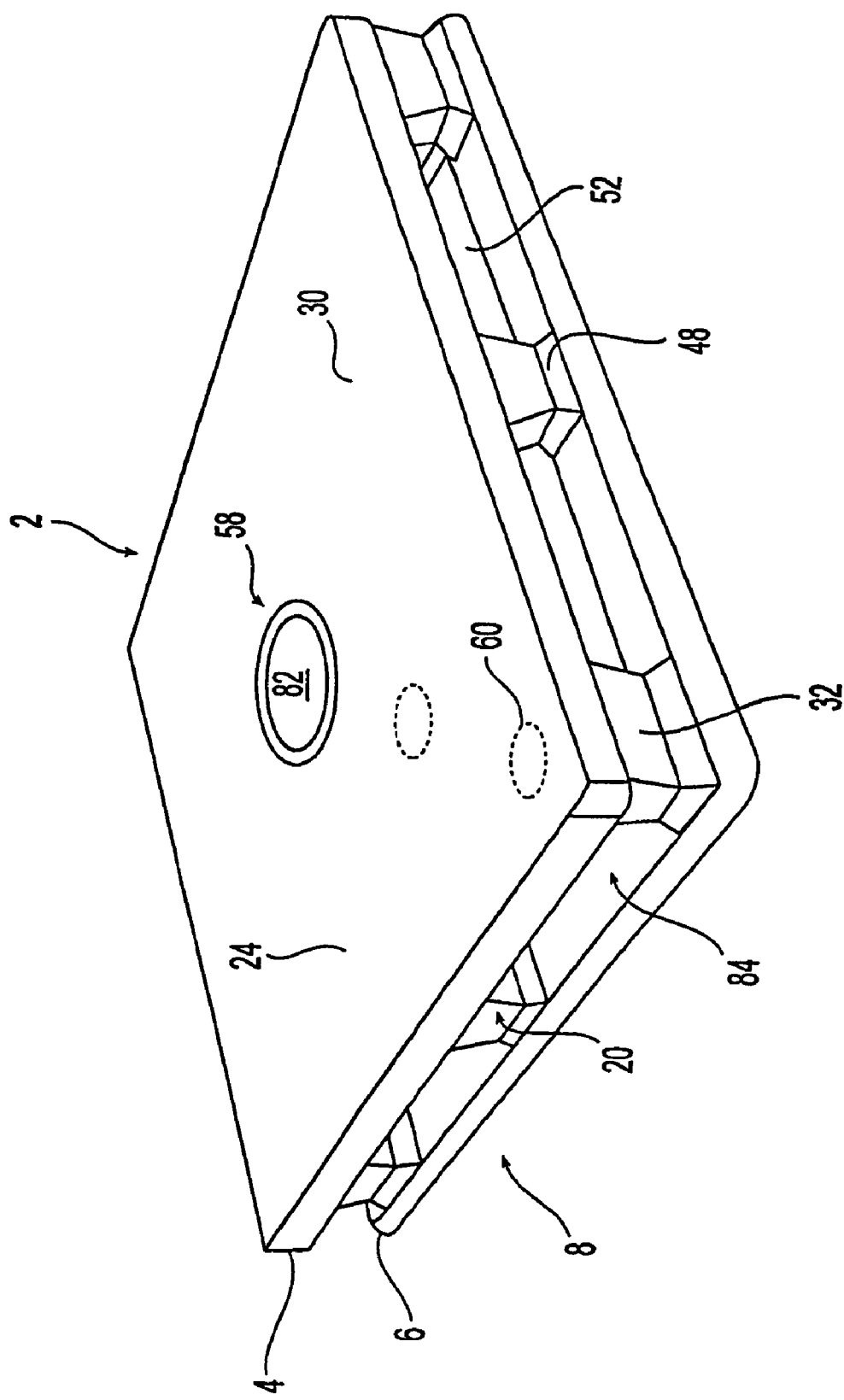
FIG. 1 is a perspective view of a GMA style 48×40 inch pallet including a compartment in the deck structure.

The present embodiments of pallet structures are merely representative of the principles of the invention and are not intended to limit the scope of the invention or application and uses of the invention. Furthermore, there is no intention to be bound by any expressed or implied theory presented in the preceding technical filed, background, or brief summary of the following detailed description. For example, the pallet structures can be made of any plastic, wood, metal, cellulose material or combination thereof. The pallet structures may be injection molded, blow molded, compression molded, differential pressure formed, stamped, die-cut, fabricated and assembled, welded, and bonded together. The pallets can take the form of GMA style 48×40 inch pallets, nine-legged nestable pallets, shipping trays, returnable dunnage and the like. Other products falling within the scope of the invention include IBCs, RPCs, ULDs, fuel tanks and the like.

One preferred embodiment involves exemplary pallet structure 2 comprising a combination of plastic forming techniques as will be described below. Further, the present exemplary pallet structure is in the form of a GMA style 48×40 inch pallet. By way of description the GMA style pallet has the specifications listed below:

1. Exact 48-inch×40-inch dimensions. Square in each direction.

2. True four-way entry. Capable of accommodating existing pallet jacks from all four sides (as opposed to current style with cutouts and stringers).

3. Minimum-width pallet jack openings of 12 inches and minimum height of 3¾ inch clearance when under load. Width of each center support must be less than six inches to accommodate pallet jacks.

4. Smooth, non-skid, top-bearing surface should have at least 85% coverage. However, 100% is preferred. Non-skid surface should be flat, or have no indentations or protrusions that could cause product damage.

5. Bottom-bearing surface of no less than 60% coverage with properly placed cut-outs (12-inches square) for pallet jack wheels from four sides. Surface should be flat or have no indentations or protrusions that could cause product damage.

6. All bottom entry edges should be chamfered to ¼-inch for easy entry and exit.

7. Overall height of platform should not exceed six inches.

8. Rackable from both the 48-inch and 40-inch dimensions. Allowable deflection in drive-in and drive through racks no more than ½ inch.

9. Compatible with pallet conveyors, pallet dispensers, skate-wheel pallet-flow racks, and automatic storage and retrieval systems.

10. No protruding fasteners.

11. Must be made of material that does not contaminate the product it carries.

12. Must meet or exceed current pallet resistance to fire.

13. Must be recyclable. Preferably made of recycled material.

14. Desired weight under 50 pounds.

15. Load capacities of 2,800 pounds. Capable of bearing 2,800-pound loads safely in stacks five loads high.

16. Repairs should be economically feasible.

17. Weather resistant.

18. Moisture resistant.

19. Capable of safely moving product, damage free, through the entire distribution channel with multiple cycles (from manufacturer through distributor to retail).

The exemplary pallet structure of the invention comprises two parts including a deck 4 and a base 6. Together the deck and the base form the GMA style pallet 8. The pallet structure 2 contains at least one identification device 10, for example a radio frequency identification device (RFID) 12 or a surface acoustic wave (SAW) device 14, although the one identification device may be any one of a tag, a capsule, a label, a printed circuit board (PCB), and the like that communicates wirelessly without limitation by employing antennas instead of cables. Preferably a first device 16 identifies the deck and a second device 18 identifies the base. Preferably each part (i.e. the deck and base) is given a unique identification, and this ID record is indicated by the two respective identification devices 16 and 18. The parts are combined to create one product 8. The one product is also given a unique identification distinct from the IDs of the associated parts. Therefore, the pallet 2 has a plurality of IDs, and in the present case three: a first ID for the deck, a second ID for the base and a third ID for the combination product.

The IDs of the exemplary pallet are characterized as first level IDs, second level IDs, third level IDs and so on. In the present case the two part IDs are level one IDs, and the one combination product ID is a level two ID. By way of example, a pallet, with ID number 1006, is associated with the combination of deck, with ID number 101, and base, with ID number 203. Unique pallet ID number 1006 expires when the association of ID numbers 101 and 203 ends. The association ends for example when the deck is reconfigured with a new base, providing a new (upgraded or customized) product. A new unique second level ID is given to the new combination product when the new association is made.

Preferably, both the first and second level IDs are evident in each identification device utilized in each part. In other words, each identification device contains code space for at least two IDs. However, when a product involves only one part the device can have a non-volatile memory or record, therefore getting by with only one unique ID. Such a case is only exemplary.

A pallet may also require a unique third level ID as discussed below. In one scenario the pallet is made by a first company and sold to a second company. The second company utilizes the pallet for internal use i.e. closed-loop purposes. The first company (i.e. the manufacturer) will have a permanent record of a production date, performance specification and material content in the unique first and second level IDs of the parts and product, respectively, sold to the second company. The second company (i.e. the end user) will know at least the second level ID for warranty purposes and the like should the second company return the pallet to the first company for recycling and the like. The second company will also have a dynamic record of the status associated with at least the second level ID or another third level ID if the second level ID is not interoperable within the end user's operating environment (in other words the end user may place another ID device inside the pallet, the second device operating in another mode or frequency band than the first). Therefore, the second company may use a third level ID to associate the pallet within its deployed track and trace system. In a second scenario the manufacturer sells the known parts and product to a second party that leases the product to third parties. A third party may require a unique third or fourth level ID to indicate a customized characteristic indicative of the product. For example, a third party may monitor external temperature to know the shipping status of a unit load. The information indicative of temperature is associated with a unique third or fourth level ID that is distinct from the first and second level IDs associated with the parts and pallet product. Hence, a pallet product may have a plurality of unique IDs.

Therefore, one now appreciates that a pallet must be configured to comply with the GMA performance specifications while at the same time interoperating within a variety of RF-rich environments.

For this purpose the exemplary pallet of FIG. 1 is suggested. Pallet 2 is known as a GMA style 48×40 inch pallet 8 and complies with all 19 GMA performance specifications listed above. Pallet 2 comprises a deck part 4 and a base part 6. The deck and base snap together to provide a single pallet product 8.

Although the deck and base can be constructed utilizing any combination of materials and formed using any forming technique, the preferred structure is primarily based upon differential pressure forming, which is some times known as thermoforming or vacuum forming. In the present case, the deck and base are thermoformed according to the triple sheet method, but twin sheet forming can be used with satisfaction. Both thermoforming arts are known in the patent record.

Triple sheet is preferred over twin sheet for several reasons, which would be known by referring to co-owned U.S. Pat. Nos. 6,749,418 and 6,718,888. Referring now to FIGS. 2-4, a section 20 of deck is seen comprising three sheets of molded plastic. A top sheet 22 provides a flat surface 24 to provide up to 100 percent surface coverage for supporting unit loads thereon (not shown). A middle sheet 26 and a bottom sheet 28 together provide a load bearing platform 30 and a plurality of double walled leg pockets 32 that support the platform above the base, to allow for the introduction of fork tines, pallet jacks and the like, which are used to move the pallet. The leg pockets 32 may be rectangular, square, round or oval in shape. The structure of a triple sheet configuration results in a hybrid honeycomb arrangement that yields a stronger strength to weight ratio than a twin sheet structure using an equivalent measure of plastic material. Furthermore, the method is preferred because sheet 22 provides a flat load support surface 34 while the two other sheets 26 and 28 form a rigid platform 30 and double walled leg pockets 32 (a twin sheet structure would have less than 100 percent surface coverage if the top sheet was deformed to provide double walled legs and therefore could not comply with specifications 4 and 15 simultaneously). Double walled legs support a higher static load than a single walled leg using the same measure of plastic. A higher strength to weight ratio is preferred for familiar economic reasons.

The present embodiment of triple sheet deck is preferred because the added strength of the structure allows the thermoforming practitioner to utilize an all plastic material combination rather than two sheets of plastic plus captive cross-members that would be required to add strength to comply with specification 8 for rack strength. All plastic is preferred because some materials used to construct the cross members may block or interfere with the transmission of RF signals. The cross members also add cost and complexity to the making, maintenance and recycling of the pallet structure.

Figure 6:
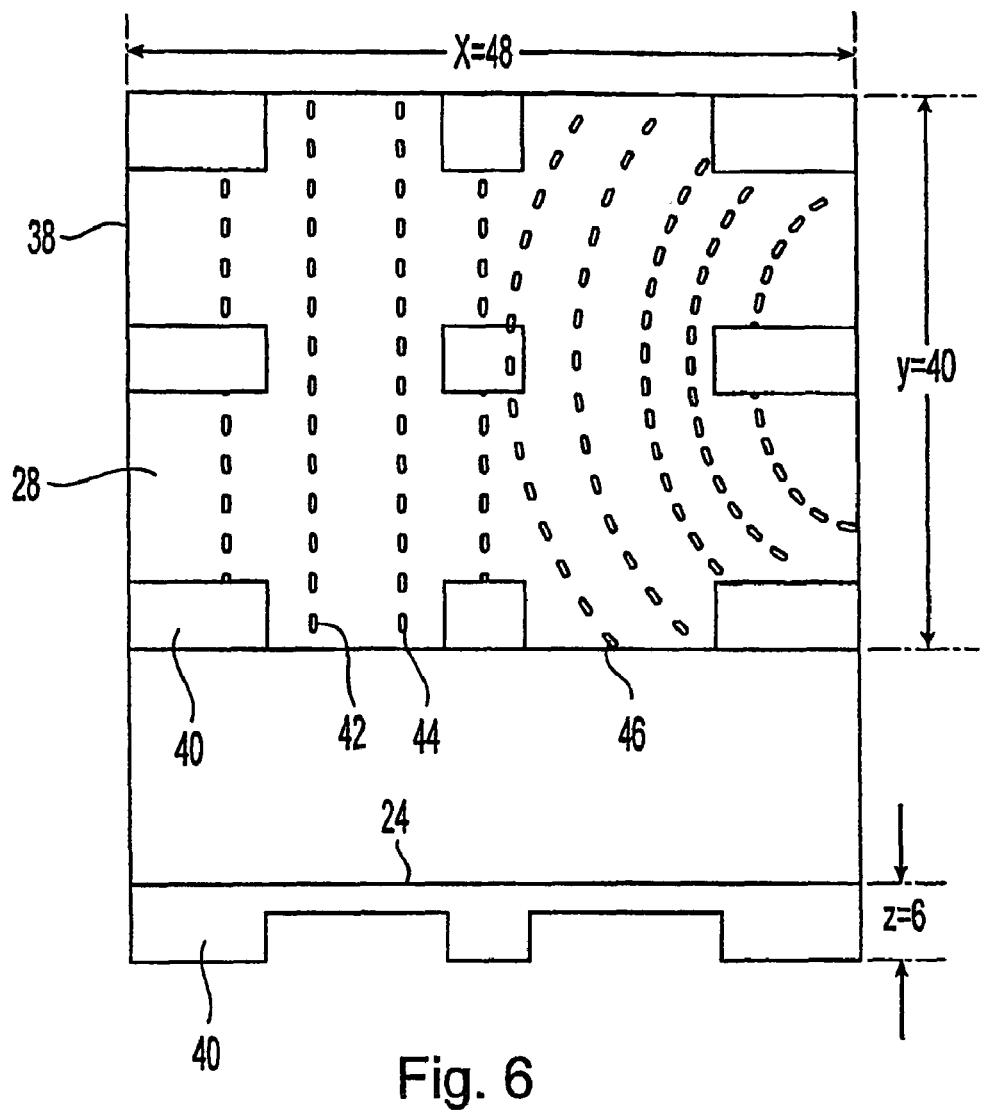
FIG. 6 is a plan view showing the underside of the deck structure and a side elevation view showing the deck structure from the 48-inch side of a pallet.

In the present exemplary case the middle sheet incorporates a series of angles 36 arranged in the 48 inch direction of the 48×40 inch deck, although the angles can be arranged in the 40 inch direction with satisfaction. The angles extend between and fuse to the top sheet and the bottom sheet in a repeating manner between the opposed sides 38*a* and 38*b* that are 40 inches apart, and thus maintain the top sheet and the bottom sheet a fixed distance apart (+/−1.5 inches). There may be as many as 80 angles or as few as 20 angles extending from side to side in a 48×40 inch pallet foot print. The angles are interrupted in nine locations 40 designated for leg pockets, although any number of leg pockets or parallel runners falls within the scope of the invention. The bottom sheet incorporates a series of rigidifying blocks 42 that are positioned in line 44 to restrict the angles from bending, like an accordion, when the structure is loaded. The blocks may be short or tall, extending less than or the full height of the angles. The blocks are further aligned as suggested in FIG. 6, so that the blocks create an in-line ribbed structure 46 adding additional reinforcement substantially perpendicular to the stronger 48 inch direction (i.e. in the 40 inch direction).

Although angles 36 are preferred, any rigidifying methodology may be used with satisfaction. The angles are preferred because they are shown to provide the best strength characteristics, as would be known by referring to an article entitled "Plate-Stiffening" written by K. Lowenfeld, published in Der Maschinenmarkt (Wurzburg, Germany), which is incorporated hereunder by such reference.

The base is also constructed according to the triple sheet method, although twin sheet can be used satisfactorily. The base is joined to the deck at a leg interface 48 by a snap fit arrangement 50. The base includes 4 square cutouts 52 that are intended to accommodate the wheels of a pallet jack or the like, which move the pallet.

Figure 7:
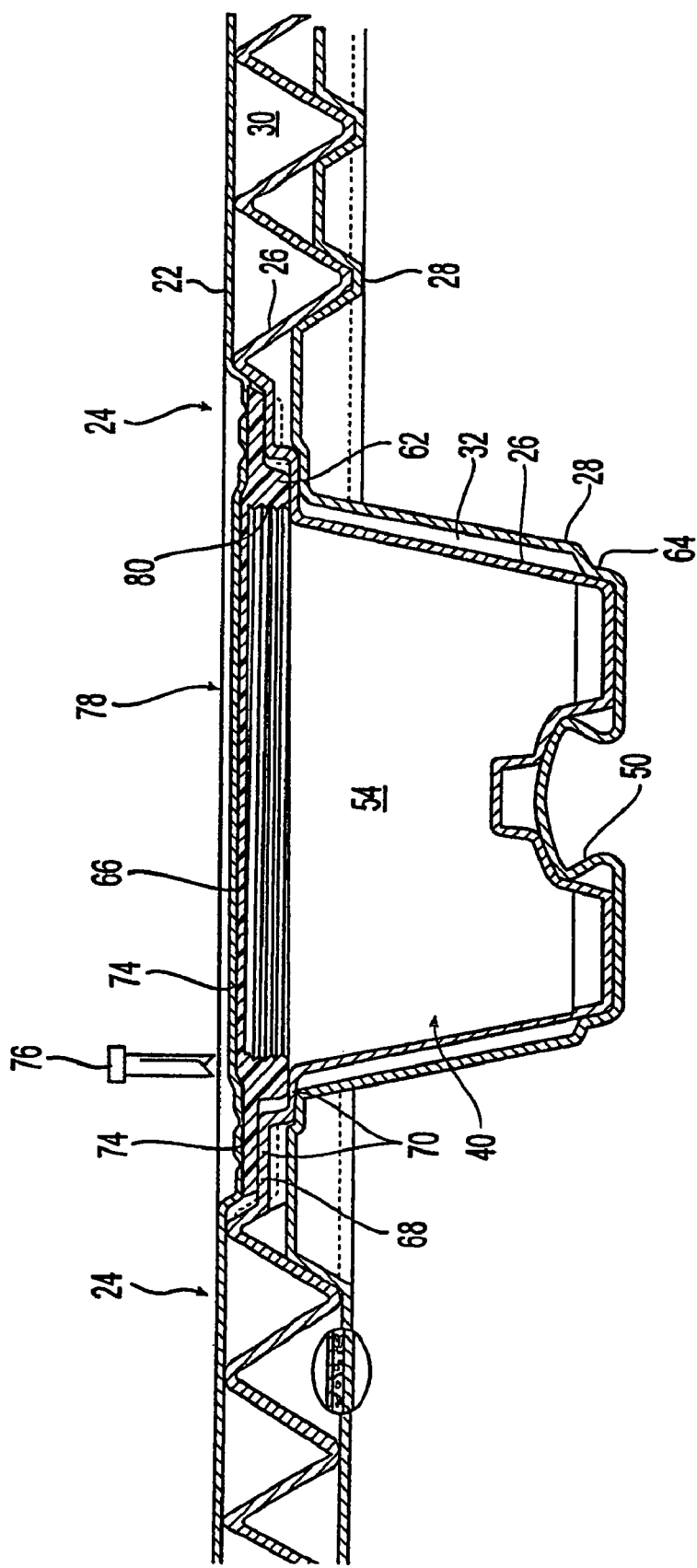
FIG. 7 is a side elevation section of the deck taken from the center region of the pallet.
Figure 8:
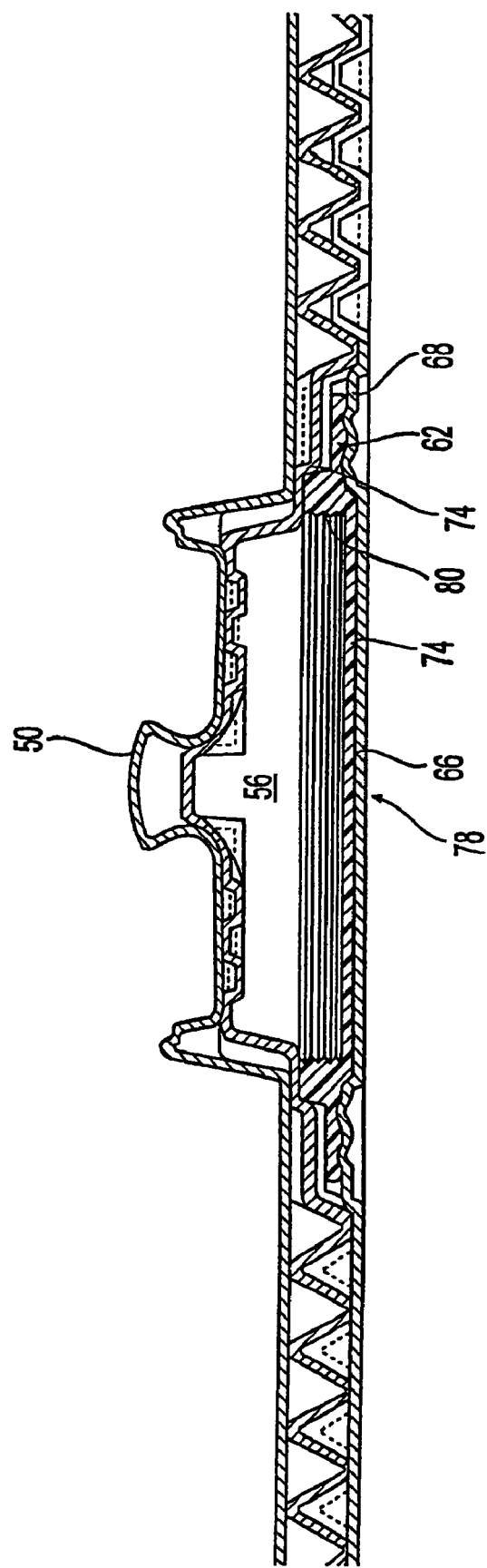
FIG. 8 is a side elevation section of the base of the pallet of FIG. 1 taken from the center region of the pallet.

As indicated in FIGS. 7 and 8 the deck and base of the exemplary GMA style pallet is adapted for operation in an RF-rich environment. In particular, the deck and base incorporate compartments 54 and 56 respectively, and the compartments are adapted to receive and enclosed electronic devices as will be described later.

With respect to compartments 54 and 56, it will be appreciated that the compartments are situated in the location of the center region 58 of the pallet structures, although one or more compartments may be formed in another location 60 corresponding to any one of the nine legs (i.e. in any deep structures) of the exemplary pallet. Additionally, compartments may be formed in locations between the leg pockets, depending upon the preferences of the practitioner. For example, if the pallet embodiment is a nesting style pallet in which case the legs inter-nest for consolidated shipment and storage, the compartment can be incorporated on a top or bottom surface of such a pallet embodiment.

It will also be understood by those familiar with the art of thermoforming that the threaded aspects 62 of the compartments can only be provided through novel intervention as will be described in reference to an exemplary triple sheet molding methodology. With respect to the deck, it should be known that the preferred thermoforming arrangement is one in which the bottom sheet 28 is first formed over a first mold (and the second mold is used as a plug-assist to help form the exterior leg structure 64 of the deep leg pocket having an approximate +/−4:1 draw ratio). Next the middle sheet 26 is formed over a second mold having deep leg pocket portions (not shown) in order to allow the cantenary effect of the heated sheet 26 to benefit the forming thereof. After the first and second sheets are thermoformed they are brought together in a twin sheet phase and compressed together by opposed platens between the first and second molds to make a twin sheet sub-assembly (not shown). The twin sheet sub assembly is extracted from the sheet line when a lower platen carrying the first mold is lowered to make way for the third sheet that is thermoformed over a third mold suspended from a top platen in a position parallel and vertically aligned with the first platen. When the twin sheet sub assembly is in the extracted position a shuttle apparatus known in the art delivers an injection molded insert 66 to a selected location 68 and deposits the insert onto the middle sheet, where formed details 70 of the middle sheet retain the insert in a fixed location upon the twin sheet sub-assembly. (The insert is not limited in size in the 48 or 40 inch directions.) After the third sheet is thermoformed over the third mold the first platen extends upward into the sheet line where after the twin sheet sub-assembly is compressed against the third sheet between the first and third molds to form an instant triple sheet assembly 72. During the "triple sheet" phase the heated third sheet and heated second sheet are caused to fuse to the exterior surfaces 74 of the insert. The insert is thereby incorporated into the triple sheet assembly. After the triple sheet assembly is extracted from the thermoforming machine a trimming router or the like removes a section 76 of material of the third sheet to provide a compartment opening 78, thereby exposing threads 80 formed in the insert, which threads are adapted to receive a cover 82 as will be described later.

It should be noted that the exemplary insert can be incorporated into a triple sheet, twin sheet or single sheet article. Furthermore, the exemplary insert can be incorporated interiorly (as shown) or exteriorly, depending upon the preference of the practitioner. The insert can involve threads positioned annularly on an inside (as shown) or outside surface, and the threads can be substituted with any structure that will receive and retain with security a removable cover in place to enclose the compartment.

In the present exemplary pallet the compartment is formed in the center region of the pallet so that identification and other electronic devices situated within a respective compartment thereof are substantially equidistant from a device reader positioned adjacent the pallet, for example a hand held, portal or fork lift mounted reader Furthermore, the compartment is formed in the center region of the exemplary pallet because the deep leg pocket structure of the pallet affords more space for the compartment than would be the case if the compartment where located in a position between the leg pockets. GMA specifications call for a deck 4 thickness of 1.5 inches, a base thickness of 0.75 inches and an overall pallet height of 6 inches. This provides a fork lift opening 84 between the deck and base of 3.75 inches, allowing a maximum 0.250 inch for deflection to remain within GMA tolerance. Therefore, the deck and base structures of a GMA type pallet do not have the thickness to allow for a deep compartment. By developing a compartment in the legs of a pallet the compartment can be considerably larger allowing for the use of larger identification devices and even a plurality of devices, as will be described later.

Therefore the leg pockets are utilized to increase the size capacity of the compartment. In the present embodiment, the depth of the compartments 54 and 56 of the deck and base are 4 inches and 1.5 inches, respectively. A compartment formed otherwise in the platform section of the deck would be +/−1.25 inches in depth, and a compartment formed in the base would be +/−0.5 inches, while allowing for the thickness of the pallet material.

It is advantageous to provide a large compartment because there is a need to accommodate at least one large ID device plus other devices and sensors as will be described below.

Tags communicate with a reader through an antenna. Tags exist in all forms, shapes and sizes. A number of factors determines the form, shape and size of the antenna, whether it is a small (postage stamp) planar antenna, a small capsule or cylindrical antenna, a label antenna of any type, a printed circuit board, a formed (helical, notched) aerial antenna and the like, as well as passive, active or active/passive antenna. Any combination and variety of antenna, whether deposited on a carrier or formed from a conductor can be accommodated within the compartment. The antennas can also be orientated vertically, horizontally, or diagonally with respect to the reader's signal pattern, broadly interpreted.

Therefore, the compartment should be as large as possible to accommodate a wide range of antenna in a number of different orientations suitable for tag to reader data exchange.

For example, Ultra High Frequency (UHF) (e.g., 915 MHz, 2.45 GHz) electromagnetic tags are preferred in association with pallets because of their relatively long range abilities. Lower frequency (e.g., 125 kHz, 13.56 MHz) electrostatic tags are preferred for close range inventory or shelving applications requiring good signal carrier reflection. However, all frequency bands and modes of operation (i.e. electromagnetic, electrostatic, acoustic) are intended to be used by any possible identification device that may be located in the compartment in order to monitor the pallet and its unit load through all stages of the disparate supply chain.

Lower frequency antennas are comparably large in relation to UHF antennas. Low frequency tags are characterized by label style structures in which a low conductivity ink may be applied to a lower cost substrate to provide a planar antenna that is non-resonant. Such a tag antenna may, by way of example only, be 2×2 inches in size and less than {fraction (1/32)} inches in cross section. Furthermore, when the low frequency tag antenna is increased in size the range typically increases. Therefore, the larger the compartment, the larger the antenna that can be protectively accommodated inside the pallet, and therefore the greater the tag read range. Increased read range is regarded as beneficial in most cases.

Furthermore, it is known that when the conventional antennas of the reader and the tag are perpendicular to the direction of the signal that there is more effective communication there between the two. Therefore, the tag antenna structures may preferably occupy designated space inside the compartment to facilitate a preferred reader to tag orientation. In association with this requirement, one low frequency tag may contain three antennas in three orientations, as will be discussed below.

Figure 9:
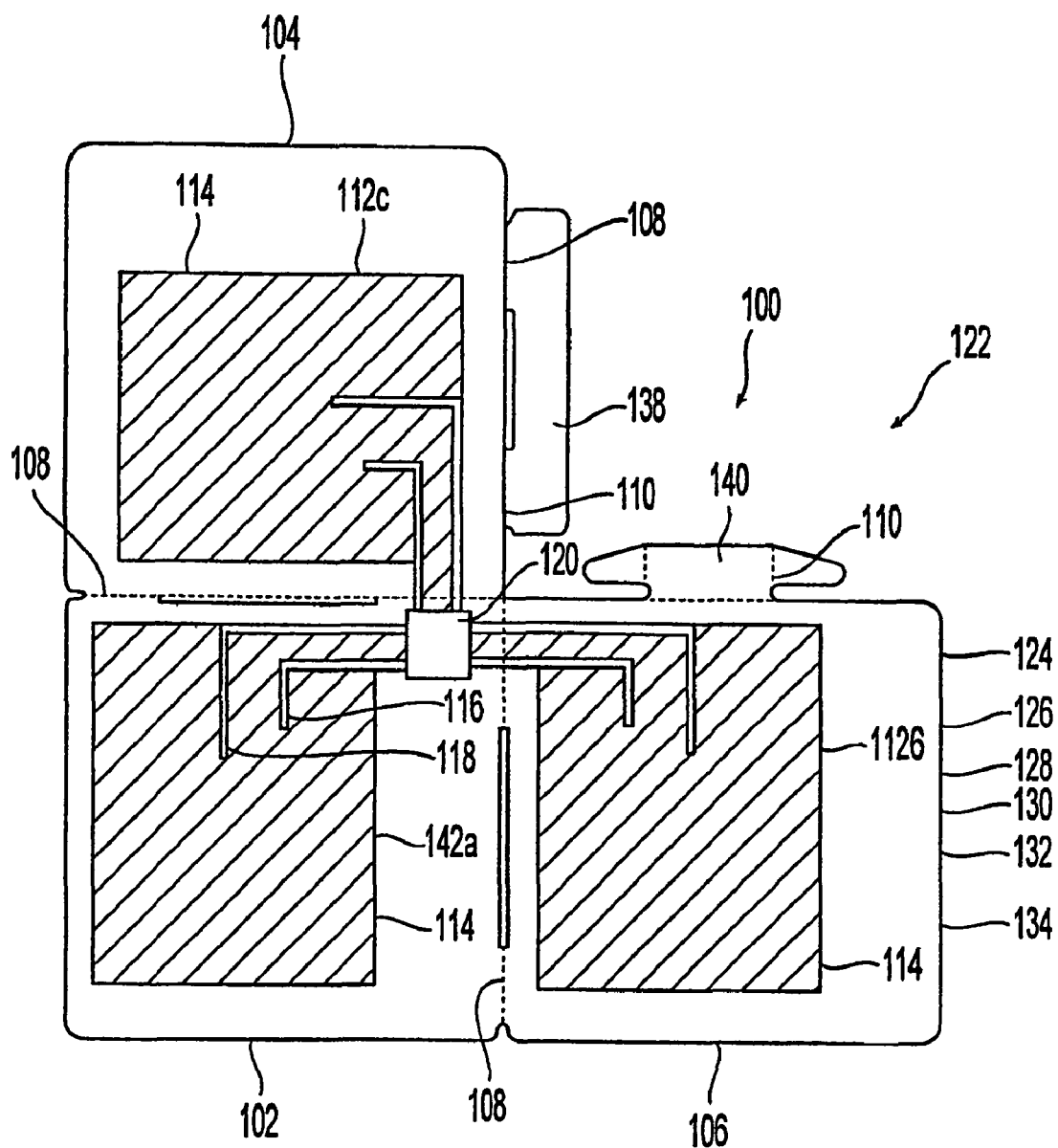
FIG. 9 is a plan view of one embodiment of an RFID tag comprising three sections and showing within each section a plurality of antenna structures.
Figure 9A:
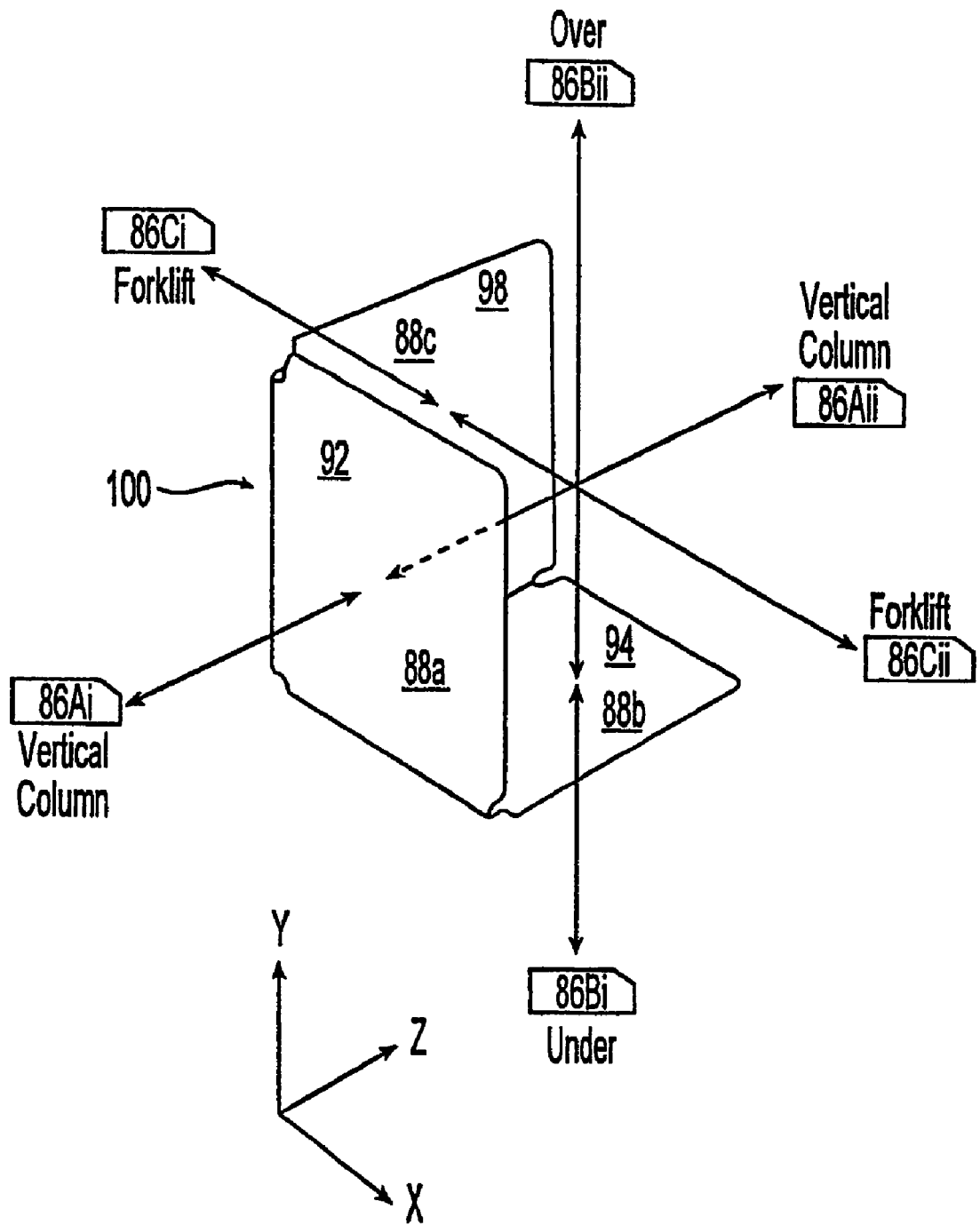
FIG. 9a is an isometric view illustrating a three-dimensional antenna array structure described in FIG. 9.

As shown in FIG. 9a, readers 86 may be fixed, mounted or hand held. In a first setting there may be a portal arrangement in which the reader comprises a reader antenna array 88a situated on vertical column. A preferred tag antenna orientation 92 for this setting would be vertical. In a second setting the reader antenna array 88b may be situated above or below the path traveled by the tag, and the favored tag antenna orientation 94 would be horizontal. In a third setting the reader antenna array 88c is mounted on a fork lift, and the preferred vertical tag antenna orientation 98 may be perpendicular to vertical orientation 92. In order to facilitate the full range of preferred tag orientations 92, 94 and 98 it may be necessary to rotate the pallet 90° in order to provide proper orientation in any of the three settings suggested. Alternatively it may be helpful to provide a tag that is best orientated parallel to the direction of the signals, as is known in the art in connection with RFID systems for books, file folders and the like. As this extra work or correction would be inconvenient and slow the pace of the pallet's movement through the supply chain an antenna 100, as shown in FIG. 9, can be segmented into three sections 102, 104 and 106 such that the tag substrate is folded as indicated at 108, along creases 110. Additionally, the tag may be structured so that on each of the three surfaces there is, by way of example only, a multi-frequency antenna array 112a, 112b and 112c, comprising a low frequency antenna 114 and high frequency antennas 116 and 118. The three antenna arrays 112 are connected to a tag module indicated 120 including at least an IC to provide a unique ID and circuitry for coupling the antenna arrays 112 with a wide range of readers and reader positions as the pallet moves throughout the supply chain. Therefore to insure the pallet is able to move through different settings it would be important that the compartment facilitate a number of larger rather than a smaller antenna and orientations (i.e. "X", "Y" and "Z" planes) of the present invention.

By way of further explanation, the antenna arrays 112 can be sub-divided further into discreet antenna structures such that the antenna structures on each surface can communicate within different frequency bands, such as with a dipole antenna wherein one pole 116 resonating at 915 MHz communicates with a first reader and a second pole 118 resonating at 2.45 GHz communicates with a second reader. In this fashion the tag can be developed to communicate with a plurality of readers distributed throughout the supply chain.

The identification device of FIG. 9, indicates a top view of a label style RFID device 122 comprising at least one of a substrate layer 124, a dielectric layer 126, a conductive layer 128, and adhesive layer 130 and a printed layer 132 to provide semi rigid carrier 134 onto which an tag module (IC) 120 is attached. Other circuitry may also be included in the module or associated with the module on the carrier to switch from one antenna frequency band to another or to communicate over more than one frequency simultaneously. There are three sections 102, 104 and 106 made evident when the tag 122 is formed (for example steel rule die). The three sections are made along crease lines 110 that permit the carrier to be orientated parallel with the reader antenna arrays in three planes. The carrier fold is retained in place by male and female tabs 138 and 140 or any other means forming three antenna bearing planes. Such an arrangement enjoys superior communication with a multitude of reader positions.

It may also be recognized that the first identification device may coexist with a second communication device. Hence the need for capacity in the size of the compartment. For example, futurists project a 10 percent improvement in world wide GDP as a consequence of the deployment of wireless communications involving RFID, sensors and actuators.

Therefore, whether the identification device uses band width in the 830 megahertz (cellular), 13.56 megahertz (RF), 1.6 gigahertz (GPS), 1.7-1.9 gigahertz (PCS), 2.4 gigahertz (Bluetooth), 5.8 gigahertz (IEEE802.1 standard for LAN) or surface acoustic wave (SAW), the antenna(s) thereof can be accommodated inside the compartment.

Figure 10:
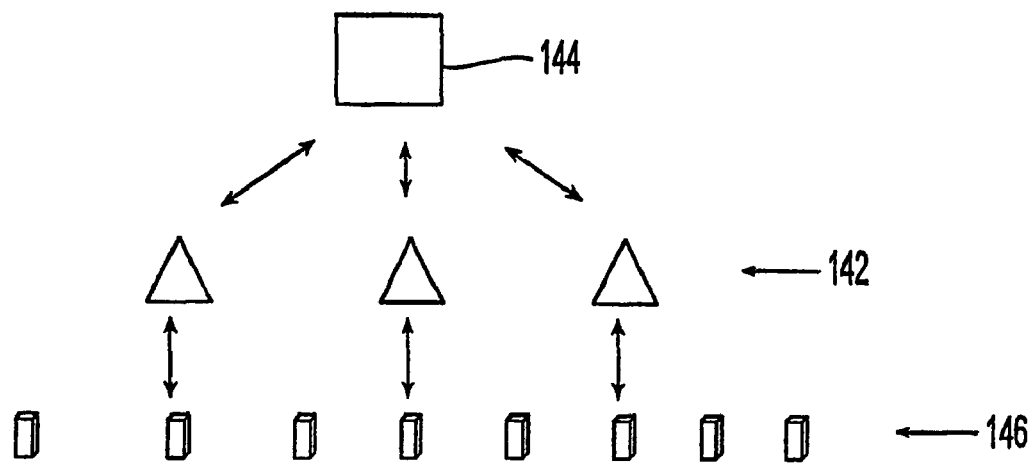
FIG. 10 is a diagram illustrating the prior art of a basic RFID system.
Figure 11:
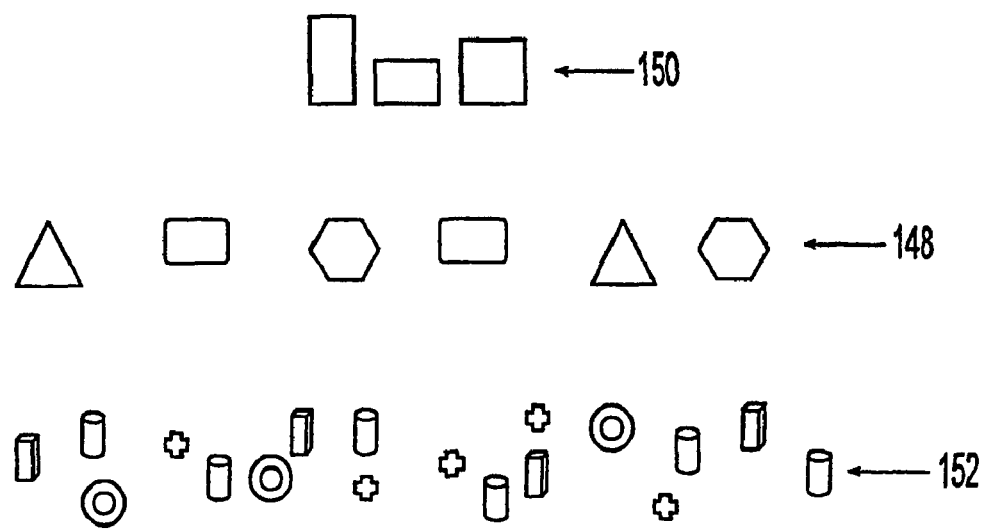
FIG. 11 is a diagram illustrating the complexity of overlapping non-interoperable basic RFID systems.

The prior art of RFID is indicated in FIG. 10 in which a distributed network of readers 142 is deployed to convey data to and from a host 144 and a plurality of tags 146. Today's ID devices including RFID tags are adapted to flourish in the "ideal" reader distributed network 142, where middleware can diagnose and use the data for operational purpose, broadly defined, captured by the system. In the real world however, the RF environment is really indicated by FIG. 11, in which there are a multitude of competitive, proprietary and legacy non-interoperating systems including overlapping distributed reader networks 148, a plurality of non-interactive hosts 150 and a multitude of incompatible tags 152, plus transnational jurisdictional constraints. Together these elements have withheld consensus on a universal agreement on protocol standards.

Figure 12:
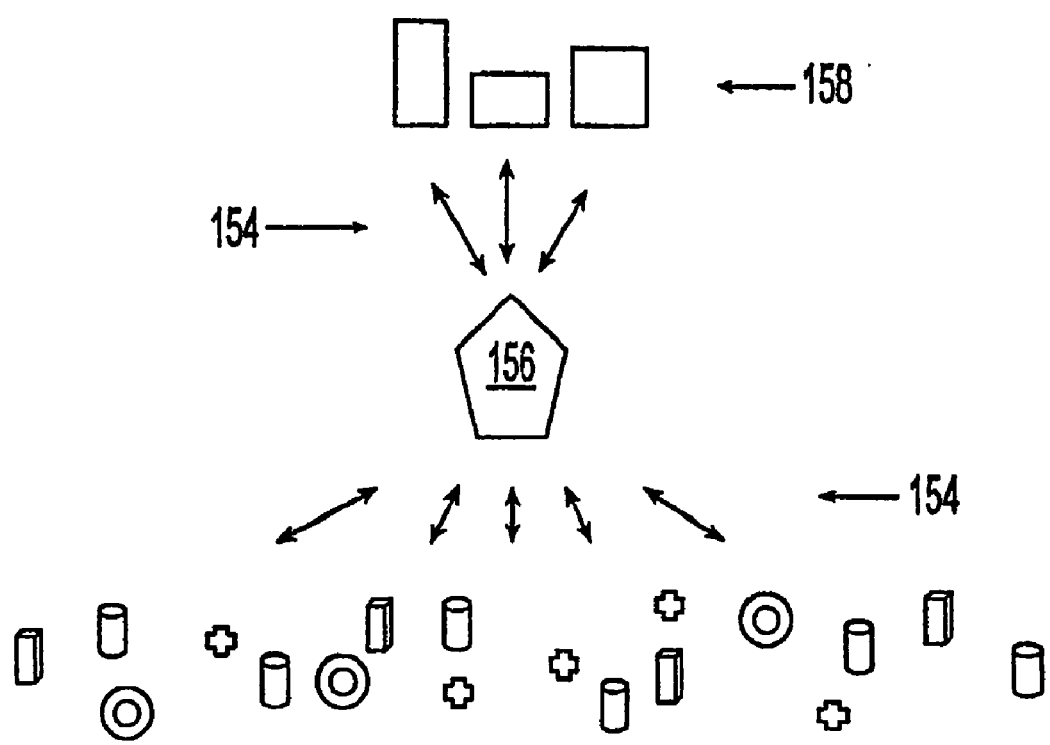
FIG. 12 is a diagram illustrating the invention wherein a cellular network is used to provide a communication link between a pallet ID device and a supply chain host.

Accordingly, "next" generation systems of the inventions hereof are indicated, by way of example, in FIG. 12, in which a pallet communicates directly through a cellular network 154 to a network host 156, without using the distributed network of readers. (Several cellular systems exist to encourage competition of service.) There may be local area interrogators associating the pallet within the a local area supply chain to identify the unit load (i.e. items having associated optical, acoustic or RF identification devices), but the cellular equipment on board the pallet obviates the need to establish distributed networks of readers and is more efficient as the cellular networks already exist.

The association of sensors with local and far range communicators is also contemplated in the present invention. For example, a second identification device 160 could be provided on a rigid circuit board 162, also comprising RF tags for conventional track and trace functionality, for far range wireless communication capability. In one setting a customized pallet is utilized in the storage and transportation of a hazardous material in a multi warehouse supply chain. Each customized pallet is adapted to comply with standards within the jurisdiction that relate to the safekeeping of the hazardous material, such that external environmental conditions, including high temperature exposure, although any external condition or indicator could be monitored, are recorded in real time, such that upon the occurrence of a catastrophic high heat event the second communication device 160 could send out a 911 emergency call to effect the implementation of an emergency protocol. Therefore, in one embodiment the pallet may include a thermo graphic sensor 164 in the base 6 to monitor temperature and upon detection of indications of high or low temperature outside a proscribed range, actuates a LAN communicator 166 in said base to transmit a signal to a LAN receiver 168 in the deck 2, wherein circuitry actuates a cellular communicator 170 to dispatch a 911 signal in association with a unique identification code to identify the pallet and its unit load along with external temperature conditions. Such a capability would improve the productivity of emergency responders and reduce the consequences of environmental damage and distress on a community in the event of hazardous material accidents.

In the present case the second communication device 160 is not developed to communicate with a host over the 2.4 GHz or the 5.8 GHz bands because of the intermediate read ranges of these frequencies (although in other embodiments of pallets more than one band may be utilized for local use, such as by fire and emergency respondents, who within range of 100 yards would be able to read "emergency instruction" signals emanating from the pallet over a Bluetooth hand held or on-board LAN vehicle communication system.) For Example, the pallet may be on the move from one plant to another and there would be a need to communicate instantaneously hundreds of miles in the event of an accident. To achieve this purpose the second identification device includes at least a second antenna, such an 830 megahertz helical coil antenna 172 operating in a cellular frequency band that can send a signal generated by the 911 protocol contained in the IC. The cellular communications components could exist within a separate module added to an identification device or could populate the circuit board along with other devices and modules of the identification device.

The cellular module 170 would be low cost. One must remember that there are 2.2 billion pallets in use in North America. The demand world wide for cellular enabled pallets could be in range of hundreds of millions, providing sufficiently large economies in scale to reduce the cost of simple cellular devices considerably. The embodied cellular module excludes at least one of a touch pad, a screen, a mouthpiece, a speaker, a camera, a vibrator, and a plastic housing which all add costs, and only includes a circuit board and at least one of a transmitting/receiving antenna (i.e. 172), a digital signal processor, a memory chip, a identification reader card, circuitry, and one of an internal or an external power supply. In deed, the cellular module would be disposable to extent that the value added benefits of remote data transfer would be captured by the cellular network host through the sale of used band width or the like over a period of use, as is the routine with cellular telephony. One would assume the cellular module would be given away to lock up the income stream that will result from a service contract involving the use of digital bandwidth.

Figure 13:
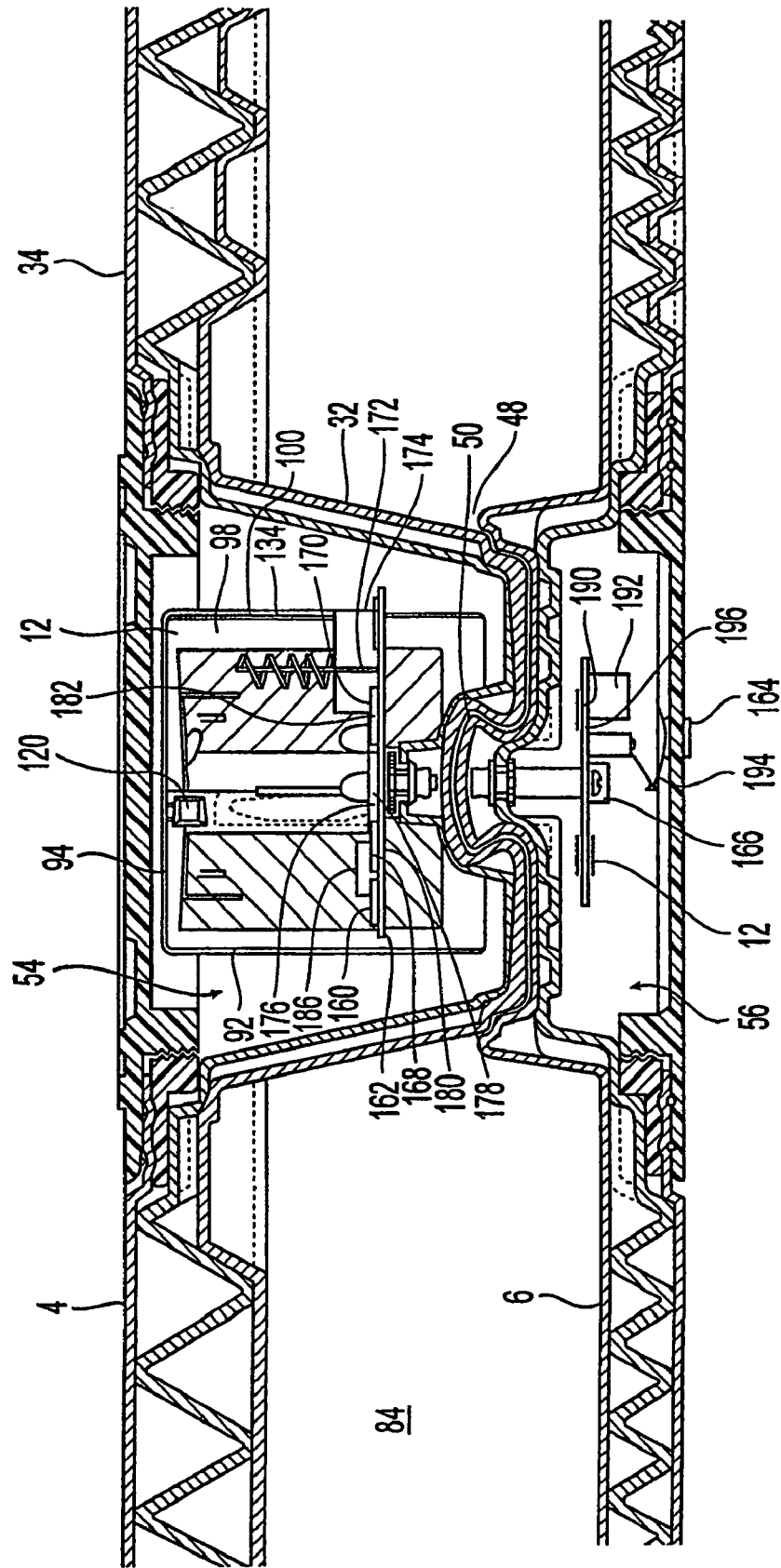
FIG. 13 is a side elevation section showing the combination of the deck and the base of FIGS. 7 and 8 respectively wherein the ID devices and communications modules of the invention are protectively housed within the compartments of the present invention.

Other devices that may populate the circuit board(s) in the respective compartments of a pallet are suggested in FIG. 13 in which at least one of the following components are contemplated: power supplies 174 (including conventional batteries, mechanical renewable power supply devices, solar batteries and RF energy harvesting apparatus); antenna arrays 176; Bluetooth communications modules 178; LAN communications modules 180; PCS communications modules 182; cellular communications modules 184; GPS communications modules 186; an interrogation module 188; RFID communications modules or tags 190; sensor modules 192; sensor probe assemblies 194; integrated circuitry and memory devices 196.

Figure 14:
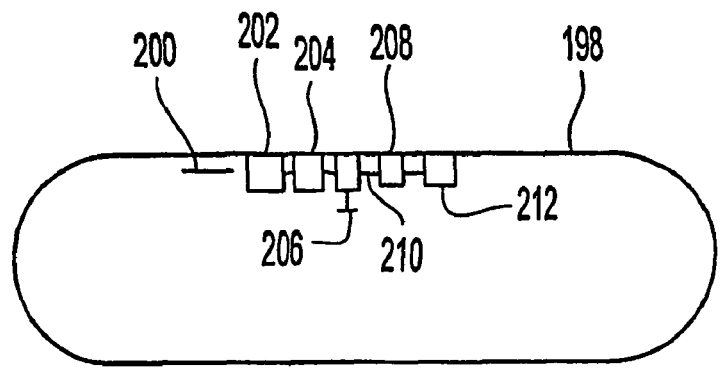
FIG. 14 is a side view of a section of a fuel tank for moving vehicles showing an electronic device with a RFID device, a wireless communications module, a sensor module, a sensor assembly, an actuator and a power supply.

Referring now to FIG. 14 there is seen a fuel tank 198, such as a fuel tank for an automobile, containing an ID device 200 selected from a group of at one of a passive tag, a battery-powered semi-passive tag or an active tag. In addition, the fuel tank contains at least one of wireless communications device 202 selected from a group comprising a Bluetooth communications module, a LAN communications module, a PCS communications module, a cellular communications module, a GPS communications module, and an interrogation module. Furthermore, the fuel tank includes at least one sensor module 204, a sensor probe assemblies 206, and actuator 208, integrated circuitry and memory devices 210, and a power supply 212.

Any combination of devices could be assembled to provide a pallet with a plurality of IDs and functional properties. A combination of devices can be situated in a plurality of compartments. From time to time the cover can be removed to access devices within a compartment so that the devices can be changed to customize a pallet for an intended application. In other cases the compartment is populated with plurality of devices that operate in multiple operating environments prevalent throughout the supply chain.

The inventions contemplate using the Internet for the sharing of data obtained from the devices. The Internet is also used to deliver data processed by a host to the devices. The Internet connection can be made remotely through an interrogator with a direct or indirect connection to the Internet or internally by one or more of communications devices located in the pallet.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. A communications system for a material handling apparatus comprising:
   a detectable RFID device having a first memory section and a second memory section,
   said first memory section containing first means to identify the apparatus, and
   said second memory section containing second means to indicate a condition of the apparatus.

2. A communications system as set forth in claim 1 in which:
   said second means indicates a condition of the apparatus that associates said first means with said second means.

3. A communications system as set forth in claim 2 in which:
    a second detectable RFID device for coupling with an object associated with the apparatus produces said second means.

4. The communications system of claim 3 in which:
    said second detectable RFID device couples with an object selected from the group consisting of a component of the material handling apparatus and a unit load transported on the apparatus.

5. A communications method comprising:
    placing a first detectable RFID device having a first memory section and a second memory section onto a pallet,
    providing a first identification code in the first memory section to uniquely identify the pallet,
    using the pallet to transport an object,
    identifying the object with a second detectable RFID device,
    producing a second identification code with the second detectable RFID device, and
    copying the second identification code into the second memory section to indicate a condition of the pallet.

6. A communications method as set forth in claim 5 which includes:
    associating the second identification code with the object while the second identification code is retained in the second memory section.

7. A communications method as set forth in claim 5 which includes:
    associating the second identification code with a condition of the pallet.

8. A communications method as set forth in claim 7 which includes:
    creating a third identification code, and
    storing the third identification code in one of the first memory section and the second memory section.

9. A communications method as set forth in claim 5 which includes:
    associating the first detectable RFID device with the second detectable RFID device.

10. A communications device for a pallet comprising:
    an RFID tag,
    said RFID tag having a first memory section for storing a first level identification code to uniquely identify the pallet, a second memory section for storing a second level identification code to uniquely identify an owner of the pallet, and a third memory section for storing a third level identification code to uniquely identify a user of the pallet, and
    said codes indicating a condition associated with said pallet.

11. A communications device as set forth in claim 10 in which:
    said RFID tag includes a fourth memory section for storing a fourth level identification code indicative of data obtained by a sensor.

12. A communications device as set forth in claim 10 which includes:
    a reading/writing unit for detecting said identification codes, and
    said reading/writing unit communicating over a network with a host.

13. A communications device as set forth in claim 10 which includes:
    a pallet body
    a plurality of spaced apart components positioned within said pallet body, and
    said RFID tag connecting to one of said pallet components.

14. A communications device as set forth in claim 10 which includes:
    said RFID tag being an RFID selected from the group consisting of a passive RFID tag, an active RFID tag, and a combination of a passive RFID tag and an active RFID tag.

15. A communications device as set forth in claim 10 which includes:
    a plurality of removable components, and
    at least one of said removable components connected to said RFID tag.

16. A communications device as set forth in claim 10 which includes:
    said first level identification code, said second level identification code, and said third level identification code being selectively detectable between levels.

17. A communications device as set forth in claim 12 which includes:
    a host for communicating with the device using said reading/writing unit.

18. A communications device as set forth in claim 10 which includes:
    an association identification code in the memory is modified responsive to a condition change.

19. A pallet recycling system for managing a pallet to support pallet recycling comprising:
    a managing section connected to a network to manage pallet distribution;
    a pallet including a radio tag, said radio tag recording and transmitting pallet distribution information;
    a tag reader/writer to read out the pallet distribution information recorded in said radio tag to write the pallet distribution information to said radio tag, and to communicate with said managing section,
    said radio tag having a read-only memory having a serial number of said radio tag recorded therein, a first dedicated memory region where information corresponding to a pallet owner information is recorded using said tag reader/writer, and a second dedicated memory region where user information is recorded using said tag reader/writer; and
    said tag reader/writer writing to said first dedicated memory region of said radio tag updated pallet owner information.

20. A radio frequency identification system comprising:
    a radio frequency identification tag that includes a memory with a first page having a page size that is defined by a first predetermined number of bytes and a second page having a page size that is defined by a second predetermined number of bytes;
    wherein the first page and the second page include data that identifies objects to be tracked by the radio frequency identification tag;
    a radio frequency identification interrogator that is configured to interrogate the radio frequency identification tag;
    a server that communicates with the radio frequency identification interrogator to interrogate the first page and the second page; and
    wherein the identified objects are associated based on a relationship between the first page and the second page.

* * * * *